US012561430B2

(12) United States Patent
Nedelcu

(10) Patent No.: US 12,561,430 B2
(45) Date of Patent: Feb. 24, 2026

(54) BLOCKING OF EXFILTRATION EVENTS VIA BROWSER EXTENSIONS

(71) Applicant: CrowdStrike, Inc., Sunnyvale, CA (US)

(72) Inventor: Radu Mihai Nedelcu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/582,051

(22) Filed: Feb. 20, 2024

(65) Prior Publication Data

US 2025/0265332 A1     Aug. 21, 2025

(51) Int. Cl.
G06F 21/55     (2013.01)
G06F 21/54     (2013.01)
(52) U.S. Cl.
CPC ............ G06F 21/554 (2013.01); G06F 21/54 (2013.01)
(58) Field of Classification Search
CPC ............................. G06F 21/554; G06F 21/54
See application file for complete search history.

(56) References Cited

U.S. PATENT DOCUMENTS

| | | |
|---|---|---|
| 8,950,005 B1 | 2/2015 | Torney |
| 10,248,797 B1 | 4/2019 | Shinde et al. |
| 11,307,911 B2 | 4/2022 | Lewin et al. |
| 11,405,363 B2 | 8/2022 | Lewin et al. |
| 11,595,437 B1 * | 2/2023 | Mushtaq ................ H04L 63/20 |
| 11,726,843 B2 | 8/2023 | Lewin et al. |

(Continued)

FOREIGN PATENT DOCUMENTS

| | | | | |
|---|---|---|---|---|
| EP | 3786823 A1 * | 3/2021 | ........... | H04L 51/212 |

OTHER PUBLICATIONS

Zimmerman Carson et al: "Ten Strategies of a World-Class Cybersecurity Operations Center", Dec. 31, 2014 (Dec. 31, 2014), XP055870535, Retrieved from the Internet: URL:https://www.mitre.org/sites/default/files/publications/pr-13-1028-mitre-10-strategies-cyber-ops-center.pdf [retrieved on Dec. 8, 2021].

(Continued)

*Primary Examiner* — Oleg Korsak
(74) *Attorney, Agent, or Firm* — Law Office of Scott P. Zimmerman, PLLC

(57)                ABSTRACT

A cybersecurity data loss prevention service stops users from stealing, or exfiltrating, sensitive data. An endpoint cybersecurity agent coordinates the installation of a browser extension. The browser extension adds content scripts to a web browser that monitor for exfiltration events. The exfiltration events represent a user's browser inputs (such as cut-n-paste or drag-n-drop) that can be used to exfiltrate usernames, passwords, credit card numbers, company secrets, and any other sensitive data. When the browser extension detects any exfiltration event, the browser extension intercepts and synchronously blocks the exfiltration event from the web browser. Moreover, the browser extension sends a duplicate copy of the exfiltration event to the cybersecurity agent for evaluation. If the cybersecurity agent determines that the user's browser inputs should have been allowed, then the browser extension is instructed to trigger the duplicate copy. The web browser thus asynchronously processes the user's browser inputs, albeit slightly delayed.

20 Claims, 16 Drawing Sheets

(56) References Cited

U.S. PATENT DOCUMENTS

| | | | |
|---|---|---|---|
| 2008/0172382 A1* | 7/2008 | Prettejohn | H04L 63/1483 |
| | | | 707/999.009 |
| 2015/0271207 A1 | 9/2015 | Jaiswal et al. | |
| 2021/0117544 A1* | 4/2021 | Kurtz | G06F 21/566 |
| 2021/0176273 A1* | 6/2021 | Hales | H04L 67/02 |
| 2022/0053009 A1* | 2/2022 | Sanchez | H04L 63/1425 |
| 2022/0303289 A1* | 9/2022 | Townsend | G06F 16/955 |
| 2022/0360607 A1 | 11/2022 | Amiga | |
| 2022/0414206 A1* | 12/2022 | Hinkle | H04L 63/1433 |
| 2023/0095576 A1 | 3/2023 | Ureche et al. | |
| 2023/0205897 A1 | 6/2023 | Leblanc et al. | |
| 2024/0039947 A1 | 2/2024 | Cohen et al. | |

OTHER PUBLICATIONS

Extendend European Search Report mailed May 16, 2025 in Application No. 25159176.4, 9 pages.
Mozilla, Bitdefender: "Bitdefender TrafficLight for Firefox—Get this Extension for Firefox (en-US)", Nov. 26, 2023, URL:https://web.archive.org/ web/20231126113424/https://addons.mozilla.org/en-US/firefox/addon/trafficlight/ , 1 page.
Microsoft, "Configure endpoint data loss prevention settings," https://learn.microsoft.com/en-us/purview/dlp-configure-endpoint-settings, Nov. 15, 2023, 16 pages.

\* cited by examiner

FIG. 3

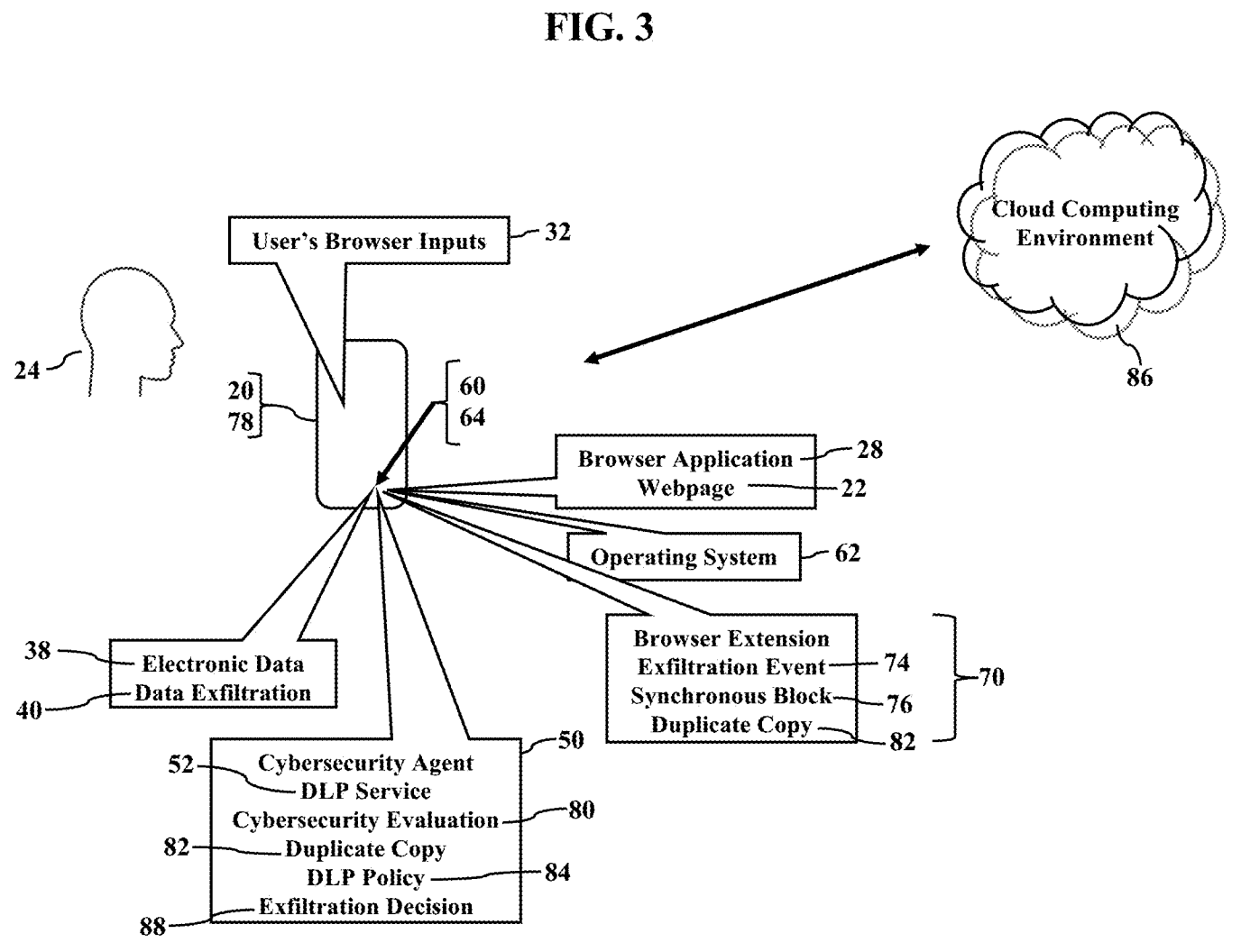

Cloud Computing Environment — 86

User's Browser Inputs — 32

24

20
78

60
64

Browser Application — 28
Webpage — 22

Operating System — 62

Browser Extension — 70
Exfiltration Event — 74
Synchronous Block — 76
Duplicate Copy — 82

Electronic Data — 38
Data Exfiltration — 40

Cybersecurity Agent — 52
DLP Service — 50
Cybersecurity Evaluation — 80
Duplicate Copy — 82
DLP Policy — 84
Exfiltration Decision — 88

FIG. 4

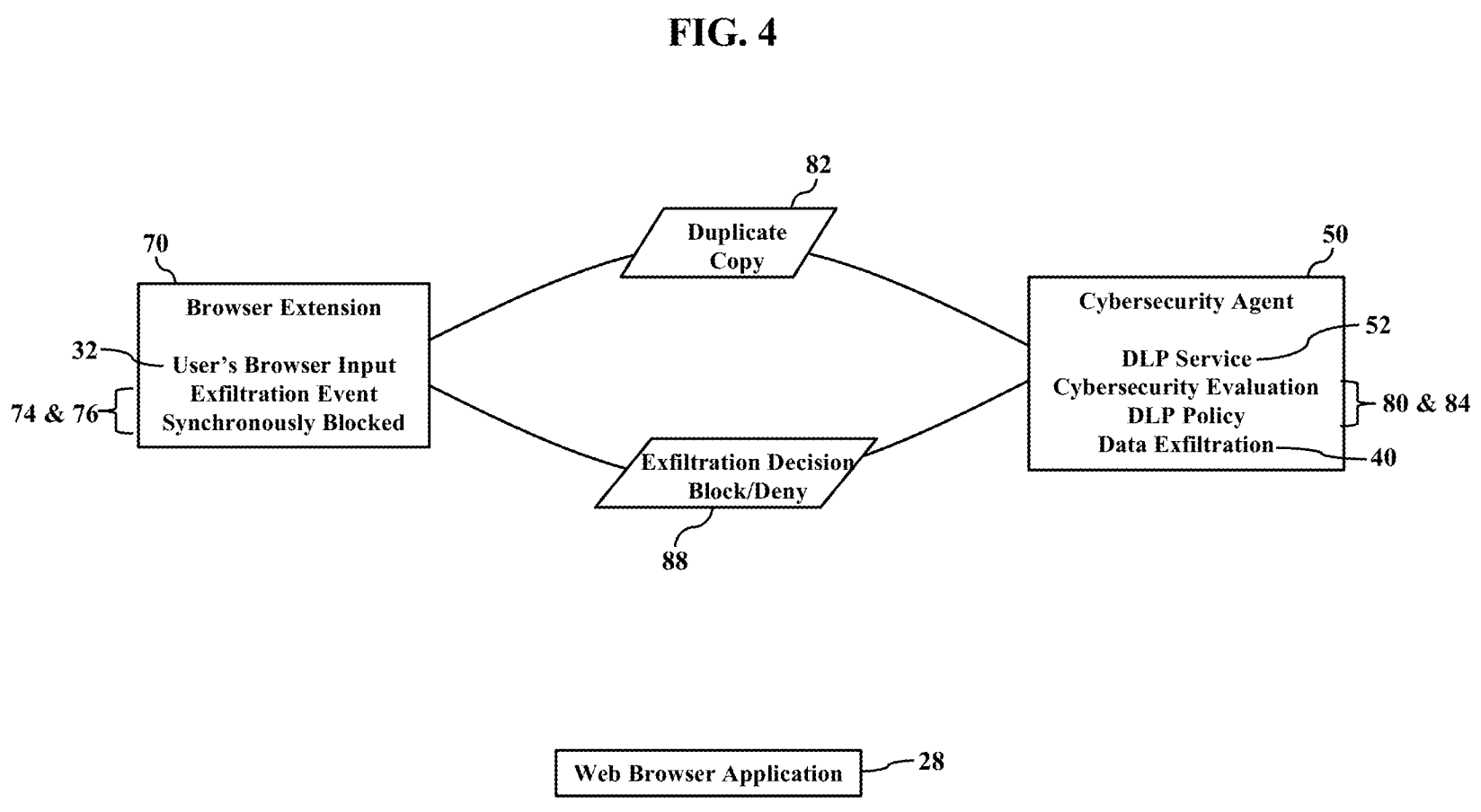

Cybersecurity Agent — 50

- DLP Service — 52
- Cybersecurity Evaluation
- DLP Policy — 80 & 84
- Data Exfiltration — 40

Duplicate Copy — 82

Exfiltration Decision Block/Deny — 88

Browser Extension — 70

- User's Browser Input — 32
- Exfiltration Event
- Synchronously Blocked — 74 & 76

Web Browser Application — 28

Start

160 — Install browser extension

162 — Receive duplicate copy generated by browser extension

164 — Perform cybersecurity evaluation based on duplicate copy

166 — Generate exfiltration decision

168 — Send exfiltration decision to browser extension

End

BLOCKING OF EXFILTRATION EVENTS VIA BROWSER EXTENSIONS

BACKGROUND

The subject matter described herein generally relates to computer security and to network security and, more particularly, the subject matter relates to data protection.

Data exfiltration is an ongoing problem. Exposure of sensitive data reveals personal data and competitive secrets. Data theft results in significant loss. Indeed, the Commission on the Theft of American Intellectual Property recently reported that American companies have lost more than $300 billion dollars in revenue due to IP theft. Misappropriation of data must be overcome.

SUMMARY

A cybersecurity data loss prevention service stops users from stealing, or exfiltrating, sensitive data. An endpoint cybersecurity agent coordinates an installation of a browser extension. The browser extension adds scripts to a web browser that monitor for exfiltration events. The exfiltration events represent a user's browser inputs (such as cut-n-paste, drag-n-drop, and/or file selection) that can be used to steal usernames, passwords, credit card numbers, company secrets, and other sensitive data. When the browser extension detects any exfiltration event, the browser extension intercepts and synchronously blocks the exfiltration event from the web browser. Moreover, the browser extension generates a duplicate copy of the exfiltration event and sends the copy to the cybersecurity agent. The cybersecurity agent conducts an evaluation of the copy of the exfiltration event and predicts whether the user's browser input was safe or malicious. If the user's browser inputs should have been originally allowed, then the cybersecurity agent instructs the browser extension to execute or trigger the copy. The browser extension inserts the copy of the exfiltration event into the web browser for processing. The web browser thus asynchronously processes the user's browser inputs, albeit slightly delayed.

BRIEF DESCRIPTION OF THE SEVERAL VIEWS OF THE DRAWINGS

The features, aspects, and advantages of data loss prevention are understood when the following Detailed Description is read with reference to the accompanying drawings, wherein:

FIGS. 1-5 illustrate some examples of data loss prevention;

FIG. 15 illustrates yet more examples of methods or operations that block and evaluate the exfiltration event; and FIG. 16 illustrates a more detailed example of an operating environment.

DETAILED DESCRIPTION

Figure 1:
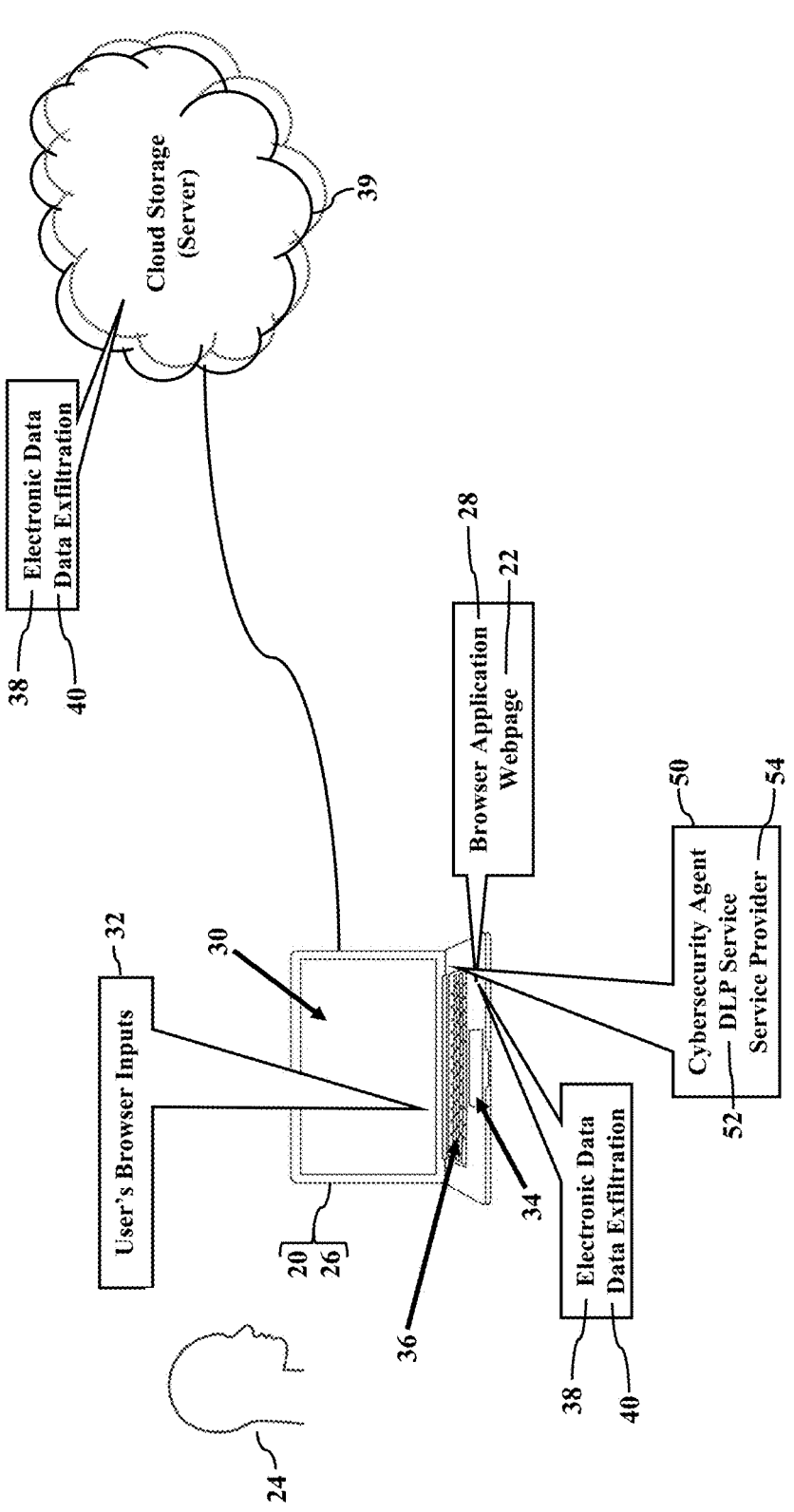

Some examples relate to data loss prevention. A cybersecurity data loss prevention service stops people from stealing data using SAFARI®, EDGE®, CHROME®, or another web browser which has the capability of using a browser extension. As we know, web browsers make it very easy for a computer user to move a mouse, or a finger, and cut-n-paste text or drag-n-drop files. These so-called user browser inputs make it very easy to move data. These user browser inputs, though, also make it very easy to steal data. If a rogue user gains access to a computer, it's very easy for the rogue user to quickly cut-n-paste passwords, user names, credit card numbers, and other personal information. The rogue user may also quickly copy personal images, hack our banking and social media accounts, and wreak havoc. A rogue or disgruntled employee may similarly access company networks and steal company secrets. The cybersecurity data loss prevention service, though, is a software service that prevents data theft. The cybersecurity data loss prevention service is downloaded as software applications to our computers, smartphones, and other devices. The cybersecurity data loss prevention service may then monitor a user's browser inputs to the web browser. If a user's browser input indicates an attempt to steal, or exfiltrate data, then the cybersecurity data loss prevention service blocks the user's browser input. The user's attempted copy/paste/transfer of data is automatically stopped to prevent loss of passwords, user names, credit card numbers, and other sensitive information.

The cybersecurity data loss prevention service, however, may also double check its work. Even though the user's mouse, finger, or other browser input was initially blocked, the cybersecurity data loss prevention service may take additional seconds to more thoroughly evaluate the user's browser input. The cybersecurity data loss prevention service, for example, performs a cybersecurity evaluation on the user's browser input. The cybersecurity evaluation determines whether the user's browser input was malicious or merely normal activity. If the user's browser input is confirmed as a suspicious attempt to steal data, then the cybersecurity data loss prevention service has already protected the data. That is, the user's mouse, finger, or other browser input was already blocked, so the data is safe. If the user's browser input, however, is determined to have been a legitimate or permissible attempt to copy/paste/transfer data, then the cybersecurity data loss prevention service re-triggers the user's browser input. The user's mouse, finger, or other browser input is recreated and executed, albeit perhaps seconds later. The cybersecurity data loss prevention service thus blocks and defeats a browser input that smells like data theft. The cybersecurity data loss prevention service, though, may also re-evaluate and reverse the block to ensure legitimate browser inputs are executed.

The cybersecurity data loss prevention service will now be described more fully hereinafter with reference to the accompanying drawings. The cybersecurity data loss prevention service, however, may be embodied in many different forms and should not be construed as limited to the examples set forth herein. These examples are provided so that this disclosure will be thorough and complete and fully convey the cybersecurity data loss prevention service to those of ordinary skill in the art. Moreover, all the examples of the cybersecurity data loss prevention service are intended to encompass both structural and functional equivalents thereof. Additionally, it is intended that such equivalents include both currently known equivalents as well as equivalents developed in the future (i.e., any elements developed that perform the same function, regardless of structure).

FIGS. 1-5 illustrate some examples of data loss prevention. As a computer system 20 operates, the computer 20 monitors a webpage 22 for malicious usage by a rogue user 24. The computer 20 is illustrated as a laptop 26, but the computer 20 may be any processor-controlled device (as later paragraphs will explain). A web browser application 28 (e.g., GOOGLE CHROME®, APPLE SAFARI®, or MICROSOFT EDGE®) generates the webpage 22, and the laptop 26 displays the webpage 22 via a display device 30. The user 24 interacts with the webpage 22 via browser inputs 32. The user's browser inputs 32 may be made using any mechanism or component. For example, the user's browser inputs 32 may be tactile or capacitive mouse/finger/pen selections made via a touchpad 34 and/or within the webpage 22. The user's browser inputs 32 may also be keyboard inputs via a keyboard 36 (and keyboard controller, not shown). The user's browser inputs 32 may also be audible commands made via a software assistant (such as APPLE SIRI® or AMAZON ALEXA®). Whatever the user's browser inputs 32, though, sometimes the user 24 has gained rogue or malicious access to the laptop 26. The user 24, as a common example, has found the laptop 26 unattended by its rightful user. The user 24, as another example, may have hacked into the laptop 26 and gained unauthorized access. The user 24, as yet another example, may be nefariously using the laptop 26 to intentionally wreak havoc.

Whatever the circumstances, the user 24 is attempting to exfiltrate electronic data 38. That is, the user 24 has entered the browser inputs 32 in an attempt to steal, copy, transfer, or otherwise exfiltrate passwords, files, and other sensitive or confidential electronic data 38. Some or all of the electronic data 38 may be locally stored with the laptop 36, and/or some or all of the electronic data 38 may be remotely stored and accessed (such as via cloud storage 39). In fact, the actual storage location does not matter. The laptop 26 must detect the user 24 attempting to steal valuable or important personal and business information. If the laptop 26 does not thwart/prevent the attempted data exfiltration 40, then the user 24 may access personal information, usernames, proprietary trade secrets, and/or other electronic data 38. Moreover, if the user 24 gains access to the electronic data 38, the user 24 may access bank/crypto accounts, steal/transfer money, hack corporate networks, post embarrassing/fake social media tales, and create much more malicious havoc.

The laptop 26, however, stores and executes a cybersecurity agent 50. The cybersecurity agent 50 prevents the user's malicious usage of the webpage 22. The cybersecurity agent 50 is a computer program, application, instruction(s), or code that monitors the user's browser inputs 32 to the web browser application 28. The cybersecurity agent 50 establishes a programming mechanism that detects the user's malicious usage of the webpage 22. If any of the user's browser inputs 32, for example, indicate evidence of the data exfiltration 40, then the cybersecurity agent 50 may automatically stop the laptop 26 from implementing the user's browser inputs 32. The cybersecurity agent 50 prevents the laptop 26 from copying, transferring, or otherwise exfiltrating passwords, files, and any other electronic data 38. The cybersecurity agent 50 thus provides a cybersecurity data loss prevention (or "DLP") service 52 on behalf of a service provider 54. The cybersecurity data loss prevention service 52 monitors the user's browser inputs 32 to prevent theft of any electronic data 38, regardless of a local or remote storage location.

Figure 2:
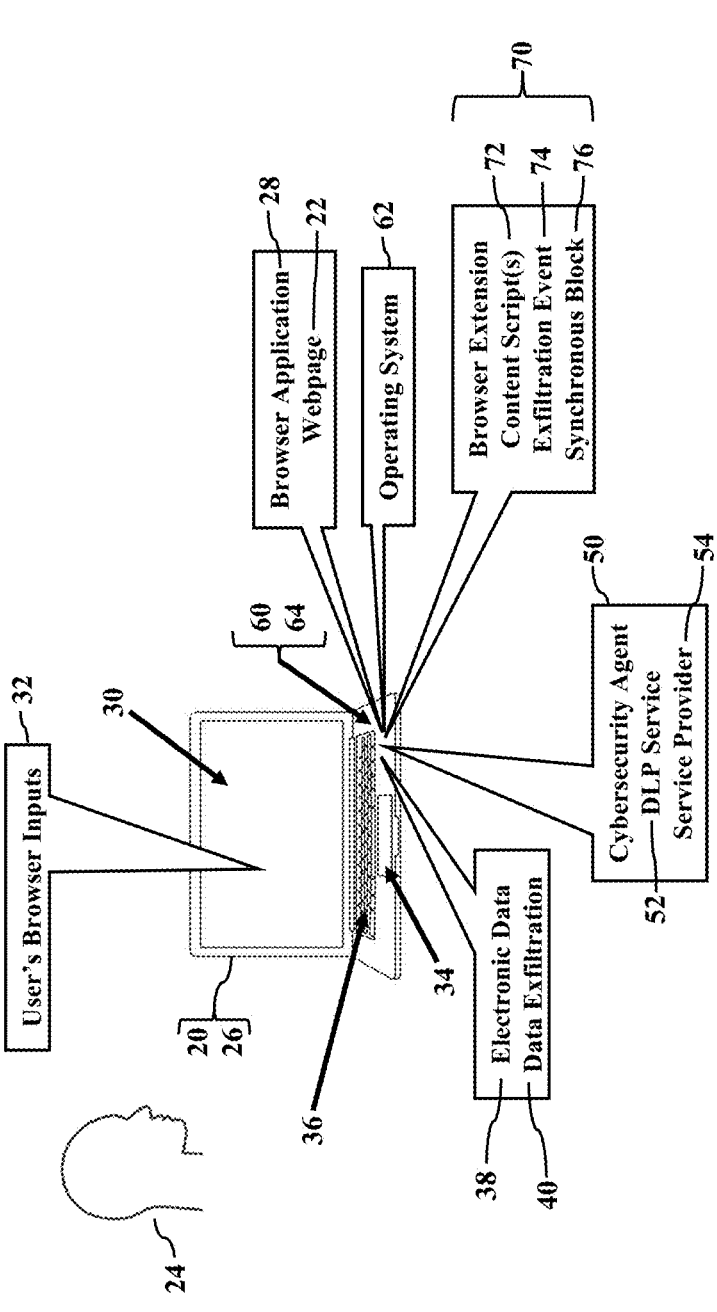

FIG. 2 illustrates examples of synchronous blocking. The computer system 20 (again illustrated as the laptop 26) has at least one hardware processor 60 (illustrated as "CPU") that executes an operating system 62 stored in a memory device 64. The hardware processor 60 also executes the web browser application 28 stored in the memory device 64. Moreover, the hardware processor 60 also executes the cybersecurity agent 50 stored in the memory device 64. The operating system 62, the web browser application 28, and/or the cybersecurity agent 50 cooperate to monitor the user's browser inputs 32 associated with the webpage 22. The cybersecurity agent 50, for example, coordinates the local installation of one or more browser extensions 70 as plug-ins or add-ons to the web browser application 28. Each browser extension 70 is a computer program, application, instruction(s), code (e.g., one or more content scripts 72) that is executed by the operating system 62 and/or the web browser application 28. Each browser extension 70 thus interfaces with the web browser application 28, the operating system 62, and/or the cybersecurity agent 50. Each browser extension 70 specifies an exfiltration event 74. The exfiltration event 74 may be any hardware or software event associated with mouse clicks/movements, keyboard depressions, touches/taps, capacitive inputs, audible inputs, or any other user's browser input 32 associated with the webpage 22 or the web browser application 28. The exfiltration event 74, for example, may include event stream processing, kernel events, process creation events, and other operating system events. The event behaviors 30 may describe any hardware and software events, messages, and/or activities. Whatever the exfiltration event 74, the exfiltration event 74 indicates that the user 24 is attempting to upload, paste, transfer, or otherwise perform the data exfiltration 40 of any electronic data 38. As an example, the browser extension 70 and the cybersecurity agent 50 may register with the operating system 62 to receive a kernel-mode and/or user-mode event notification of the exfiltration event 74. So, when the user 24 enters the browser input 32, the operating system 62 may notify the cybersecurity agent 50 and/or the browser extension 70 (such as by sending data representing the exfiltration event 74). The operating system 62 may then await instructions or authorization. The browser extension 70 may thus intercept the exfiltration event 74 prior to receipt by the browser application 28. The browser extension 70 thus implements a synchronous block 76 of the exfiltration event 74. The browser extension 70 stops or prevents the exfiltration event 74 from being received and processed by the browser application 28. The browser application 28, in other words, does not receive nor cause the operating system 62 to execute the mouse, keyboard, touch, or other user's browser input 32 that could perform the data exfiltration 40 of any electronic data 38.

The cybersecurity agent 50 and the browser extension 70 may interface with any operating system 62 and any web browser application 28. Familiar examples of the operating system 62 include any version of MICROSOFT WINDOWS®, APPLE MACOS® and IOS®, GOOGLE ANDROID® and CHROME®, UNIX®, and LINUX®. Indeed, the cybersecurity agent 50 and the browser extension 70 may be adapted to any operating system 62. Familiar examples of the web browser application 28 include MICROSOFT EDGE®, APPLE SAFARI®, GOOGLE CHROME®, and MOZILLA FIREFOX®. Likewise, the cybersecurity agent 50 and the browser extension 70 may be adapted to any version of any web browser application 28.

FIG. 3 illustrates examples of a cybersecurity evaluation 80. Here the computer system 20 is illustrated as a mobile smartphone 78. Again, though, the computer system 20 may be any processor-controlled device. Even though the browser extension 70 implemented the synchronous block 76 of the exfiltration event 74, the browser extension 70 may alert, message, notify, or otherwise interface with the cybersecurity agent 50 and await instructions. That is, even though the browser extension 70 synchronously blocked the exfiltration event 74 from the browser application 28, the browser extension 70 may also simultaneously, or nearly simultaneously, notify the cybersecurity agent 50 of the exfiltration event 74. The browser extension 70, for example, may generate a duplicate copy 82 of the exfiltration event 74. The copy 82 retains the same function, operation, performance, metadata, and/or other information as the exfiltration event 74. The browser extension 70, in other words, may generate the copy 82 by cloning the exfiltration event 74 associated with the user's browser input 32. The browser extension 70 may store data representing the cloned, duplicate copy 82 to the memory device 64. The browser extension 70 establishes communication with the cybersecurity agent 50 and sends the data representing the cloned, duplicate copy 82 to the cybersecurity agent 50. The browser extension 70 may then asynchronously await the cybersecurity evaluation 80 performed by the cybersecurity agent 50. The cybersecurity agent 50, for example, inspects and analyzes the duplicate copy 82 of the exfiltration event 74. The cybersecurity agent 50 may locally compare the cloned, duplicate copy 82 of the exfiltration event 74 to one or more data loss prevention (or "DLP") policies 84. The data loss prevention policies 84 define the browser inputs 32 that may indicate the user 24 is attempting to upload, copy, transfer, or otherwise perform the data exfiltration 40 of any electronic data 38. The data loss prevention policies 84 may further specify other logical rules for assessing a probability, likelihood, or context regarding the data exfiltration 40 of any electronic data 38. The data loss prevention policies 84 may further reference or use machine learning models trained using a corpus of the exfiltration events 74 historically observed from human- or machine-analyzed data. The cybersecurity agent 50 may additionally or alternatively establish communication with a remote cloud computing environment 86 to provide the cybersecurity evaluation 80 of the duplicate copy 82. The cybersecurity data loss prevention service 52 may thus locally monitor and analyze the user's browser inputs 32 and/or the exfiltration event(s) 74. The cybersecurity data loss prevention service 52 may additionally or alternatively employ cloud-based aspects and services that monitor and analyze the user's browser inputs 32 and/or the exfiltration event(s) 74. So, the local and/or remote cybersecurity evaluation 80 may be as simple or as complicated as desired, but the details are not necessary for this disclosure. Suffice it to say that the cybersecurity agent 50 participates in the cybersecurity data loss prevention service 52 and sends an exfiltration decision 88 to the browser extension 70.

As FIG. 4 illustrates, the browser extension 70 may respond to the exfiltration decision 88. When the browser extension 70 receives the exfiltration decision 88, the browser extension 70 may operate, function, or respond based on the exfiltration decision 88 sent by the cybersecurity agent 50. If, for example, the cybersecurity evaluation 80 confirms that the exfiltration event 74 is possible or probable evidence of the data exfiltration 40, then the cybersecurity agent 50 generates the exfiltration decision 88 to indicate a final block or denial of the exfiltration event 74. Simply put, the cybersecurity evaluation 80 determined that the exfiltration event 74 represents harmful, unsafe, or abnormal operation and, thus, the data exfiltration 40. Because the cybersecurity evaluation 80 finally denies the exfiltration event 74, the browser extension 70 may implement no further action or operation. Indeed, because the browser extension 70 previously implemented the synchronous block 76 of the exfiltration event 74, no further action or operation need be performed. The cybersecurity data loss prevention service 52, in other words, has simply ignored or rejected the user's mouse, keyboard, touch, or other browser input 32. Moreover, the user 24 may be warned or notified that the browser input 32 has been blocked. The cybersecurity agent 50 and/or the browser extension 70, for example, may cooperate with the browser application 28 and/or the operating system 60 to generate and to display an audible/visual alert. A graphical window, message, pop-up, or other warning may be generated in response to the exfiltration decision 88. Whatever the audible/visual mechanism, the user 24 may be warned that the attempted browser input 32 represents suspicious activity.

Figure 5:
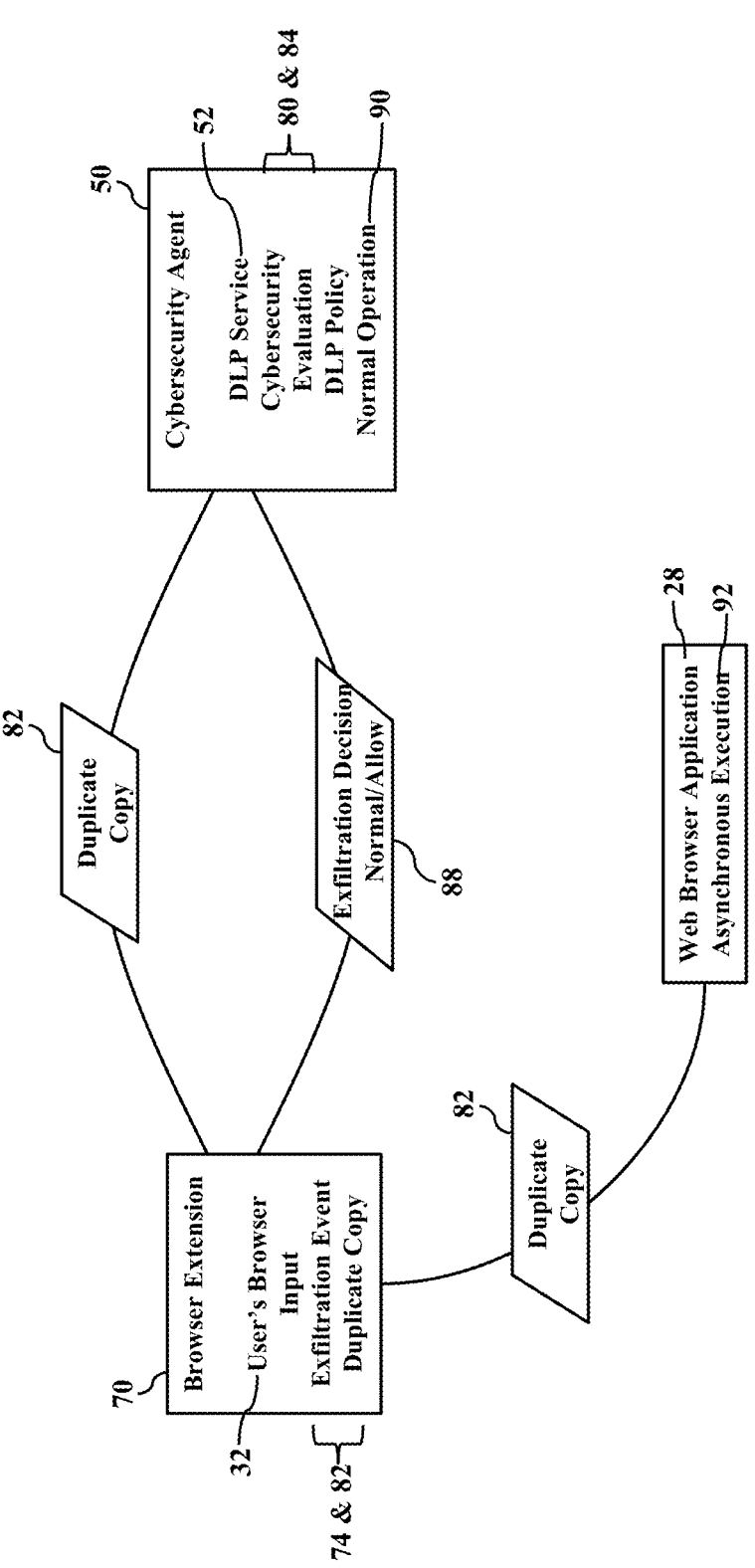

As FIG. 5 illustrates, the user's browser input 32 may be permissible. The cybersecurity evaluation 80 may determine that the exfiltration event 74 is harmless, safe, permissible, and/or normal operation 90. When the user's browser input 32 represents the normal operation 90, then the cybersecurity agent 50 generates the exfiltration decision 88 to indicate an allowance, authorization, affirmance, and/or permission to execute the exfiltration event 74. The cybersecurity agent 50 may thus instruct the browser extension 70 to belatedly allow the user's browser input 32. Because the exfiltration event 74 is permissible/allowable, the browser extension 70 re-triggers the exfiltration event 74. That is, even though the exfiltration event 74 may no longer be accessible (due to being previously intercepted and blocked/dropped), the browser extension 70 may utilize the cloned, duplicate copy 82 of the exfiltration event 74. The browser extension 70 may query the memory device 64 (illustrated in FIGS. 2-3) and retrieve the cloned, duplicate copy 82 of the exfiltration event 74 that was previously stored to the memory device 64. The browser extension 70 may then implement, cause, or force a delayed, asynchronous execution or operation 92 of the cloned, duplicate copy 82. The browser extension 70 may send or insert the cloned, duplicate copy 82 into the processing of the web browser application 28. The cybersecurity data loss prevention service 52 thus executes the user's browser input 32 representing the original exfiltration event 74, but asynchronously using the cloned, duplicate copy 82. The asynchronous execution 92 may be seconds or minutes later, depending on the time required to perform the cybersecurity evaluation 80.

The cybersecurity agent 50 may thus have a final say or authority over the user's browser input 32 representing the exfiltration event 74. The cybersecurity agent 50 installs the browser extension 70 to monitor the user's browser inputs 32 to the webpage 22. The browser extension 70 may trigger and execute in response to any exfiltration event 74 representing the user's mouse, keyboard, touch, audible, or other browser input 32. The browser extension 70 intercepts the exfiltration event 74 and synchronously blocks (e.g., reference numeral 76) the exfiltration event 74 from the browser application 28. The browser extension 70 may also interface with the cybersecurity agent 50 for the cybersecurity evaluation 80. The cybersecurity agent 50 evaluates the duplicate copy 82 of the exfiltration event 74, perhaps according to the data loss prevention policy 84. The cybersecurity agent 50 generates the exfiltration decision 88. If the duplicate copy 82 of the exfiltration event 74 suspiciously indicates the data exfiltration 40, then the cybersecurity agent 50 issues the final denial/block of the exfiltration event 74. Because the browser extension 70 already implemented the synchronous block 76 of the exfiltration event 74, the cybersecurity data loss prevention service 52 has already synchronously ignored or rejected the user's browser input 32. However, when the cybersecurity agent 50 determines that the exfiltration event 74 represents the normal operation 90, the cybersecurity agent 50 generates the exfiltration decision 88 to indicate an allowance or permission to implement the asynchronous execution 92 of the exfiltration event 74. The browser extension 70 thus retrieves and triggers the cloned, duplicate copy 82 of the exfiltration event 74, albeit perhaps seconds or minutes later, depending on the time required to perform the cybersecurity evaluation 80.

Figure 6:
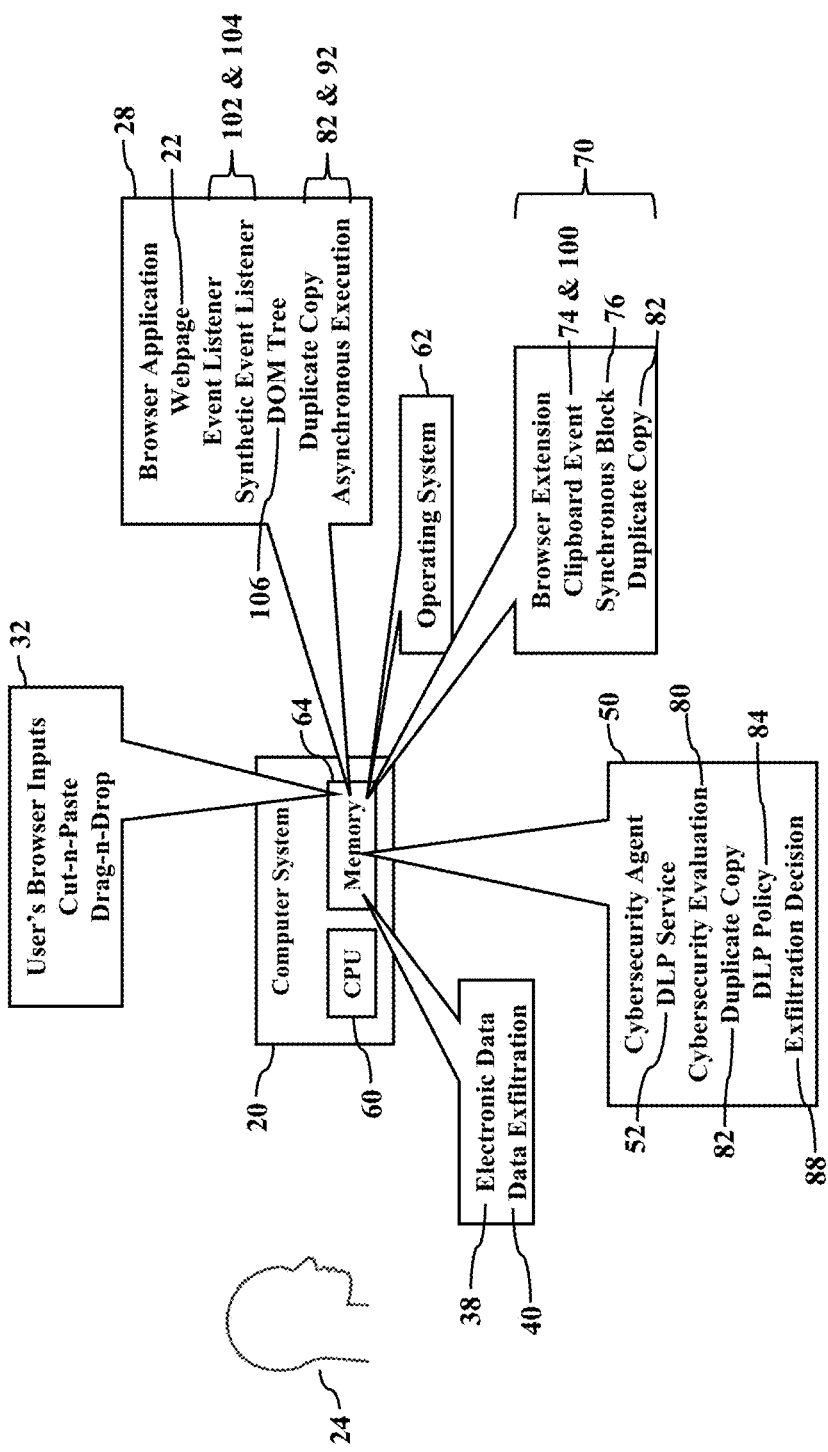
FIGS. 6-8 illustrate examples of synchronous blocking, and asynchronous execution, of clipboard events.

FIG. 6 illustrates examples of synchronous blocking, and asynchronous execution, of clipboard events 100. The cybersecurity data loss prevention (illustrated as "DLP") service 52 may cause the browser extension 70 to block the user's bowser inputs 32 representing so-called cut-n-paste, drag-n-drop, and other clipboard events 100. The user's browser input 32 thus attempts to cut-n-paste, drag-n-drop, or otherwise copy/paste passwords, files, and any other sensitive electronic data 38. When the user 24 initiates a copy, paste, insert, drop, move, or other clipboard event 100, the operating system 62, the cybersecurity agent 50, and/or the browser extension 70 recognize and interpret the clipboard event 100 as one of the suspicious exfiltration events 74. The browser extension 70, for example, intercepts the clipboard event 100 that triggers a text insertion. The browser extension 70 may implement the synchronous block 76 of the clipboard event 100, without waiting for permission from the cybersecurity agent 50 (as previously explained with reference to FIGS. 2-5). The data loss prevention policy 84, for example, may specify or authorize the immediate, synchronous block 76 of the clipboard event 100. The browser extension 70, for example, may synchronously block 76 the clipboard event 100 from reaching an event listener 102 associated with the browser application 28. The browser extension 70 injects an event listener 104 at the highest level in a document object model (or "DOM") tree 106, thus stopping the clipboard event 100 at capture phase.

As an operational precaution and confirmation, though, the data loss prevention policy 84 may also specify or authorize the nearly simultaneous cybersecurity evaluation 80 by the cybersecurity agent 50. Even though the browser extension 70 synchronously blocked (e.g., reference numeral 76) the clipboard event 100 from the browser application 28, the browser extension 70 may generate the cloned, duplicate copy 82 of the clipboard event 100 and store to the memory device 64. The browser extension 70 sends the data representing the cloned, duplicate copy 82 (or just any meaningful portion or part) to the cybersecurity agent 50. The browser extension 70 may then await the cybersecurity evaluation 80 performed by the cybersecurity agent 50. The cybersecurity agent 50, for example, may confirm the final denial/block of the clipboard event 100 (as explained with reference to FIG. 4). The cybersecurity data loss prevention service 52 has thus ignored or rejected the user's browser input 32 representing the clipboard event 100. The cybersecurity agent 50, however, may determine that the clipboard event 100 is the normal operation 90 (illustrated in FIG. 5) and instruct the browser extension 70 to re-trigger or re-issue the clipboard event 100. The browser extension 70 retrieves the cloned, duplicate copy 82 of the clipboard event 100 and implements the delayed, asynchronous execution 92 of the cloned, duplicate copy 82. The cybersecurity data loss prevention service 52 thus asynchronously executes the user's browser input 32 representing the clipboard event 100, but the asynchronous execution 92 may be seconds or minutes later, depending on the time required to perform the cybersecurity evaluation 80.

Computer functioning is greatly improved. The cybersecurity data loss prevention service 52 synchronously blocks the user's browser input 32 (representing the exfiltration event 74, such as the clipboard event 100) to immediately prevent any possible data exfiltration 40. The cybersecurity data loss prevention service 52, however, also subjects the clipboard event 100 to the more rigorous and refined cybersecurity evaluation 80 performed by the cybersecurity agent 50. Simply put, the synchronous block 76 of the exfiltration event 74 buys time for the cybersecurity agent 50 to perform a more thorough evaluation of the clipboard event 100. If the user's browser input 32 (representing the clipboard event 100) is confirmed as malicious, then the cybersecurity data loss prevention service 52 has already blocked the user's browser input 32 and already stopped the data exfiltration 40. If, however, the user's browser input 32 is not malicious (e.g., the normal operation 90), then the cybersecurity data loss prevention service 52 retrieves the cloned, duplicate copy 82 and implements the delayed, asynchronous execution 92 of the user's browser input 32. The cybersecurity evaluation 80 may only require a few or several seconds to complete, so the user 24 need only ordinarily wait a few or several seconds to perform legitimate data copies and transfers. If the user 24 experiences longer wait times, though, the cybersecurity data loss prevention service 52 may be configured to timeout. As an example, the cybersecurity agent 50 and/or the browser extension 70 may be configured with a default action (perhaps as specified by the DLP policy 84) that is automatically executed after a preconfigured time elapses from starting the cybersecurity evaluation 80. The user's wait times for illegitimate attempts, though, may be immaterial and irrelevant.

Figure 7:
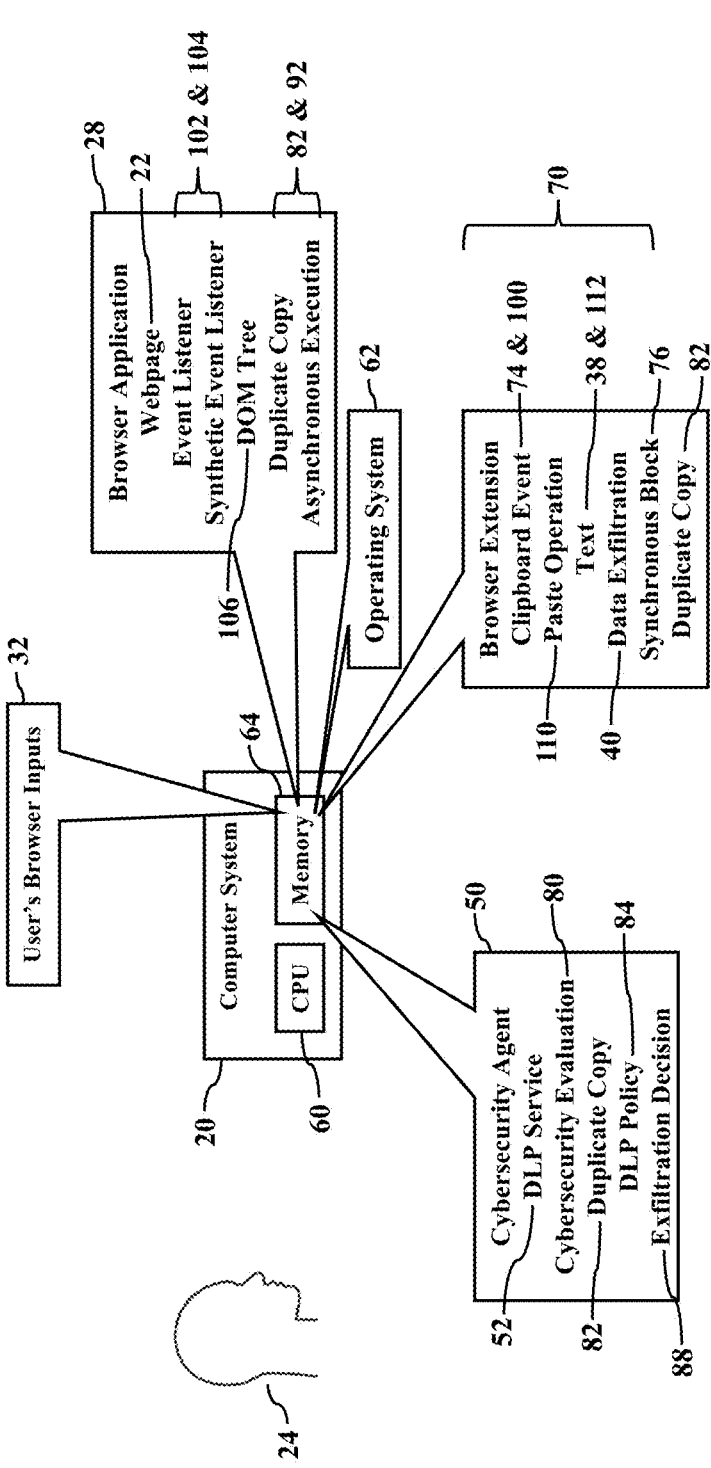

FIG. 7 illustrates more detailed examples of the synchronous blocking 76, and the asynchronous execution 92, of the clipboard events 100. Let's assume that the user's browser input 32 represents the clipboard event 100 to perform a paste operation 110 using the user's selected text 112. The browser extension 70 captures the text 112 from a paste payload associated with the clipboard event 100. The cybersecurity data loss prevention service 52 synchronously blocks the clipboard event 100 to immediately prevent any possible data exfiltration 40 of the text 112. The cybersecurity data loss prevention service 52 thus stops all the event listeners 102 from firing on the clipboard event 100. The browser extension 70 simultaneously or nearly simultaneously sends the paste operation 110, the clipboard event 100, and/or the text 112 to the cybersecurity agent 50 and may wait for a reply. The cybersecurity agent 50 performs the cybersecurity evaluation 80 using any information associated with the paste operation 110, the clipboard event 100, and/or the text 112. The cybersecurity agent 50 generates and sends the exfiltration decision 88 to the browser extension 70. If the user's browser input 32 (representing the clipboard event 100) is confirmed as malicious, then the paste (e.g., the paste operation 110) of the text 112 has already been blocked and the data exfiltration 40 was prevented. If, however, the clipboard event 100 is the normal operation 90 (as illustrated in FIG. 5), then the cybersecurity agent 50 overrides and instructs the browser extension 70 to implement the delayed, asynchronous execution 92 of the clipboard event 100. For example, because the user 24 has attempted to paste the text 112, the browser extension 70 below table, for example, summarizes the communications between the cybersecurity agent 50 and the browser extension 70, depending on the blocking action and blocking actor.

| Extension action | Blocking actor | Remarks | 2way comm needed |
|---|---|---|---|
| synchronous notification | Agent | extension will only send notification about the event, without waiting for reply | no |
| synchronous blocking | extension | blocking condition must be known in advance, on initial handshake or on configuration update | YES |
| asynchronous pending | Agent | extension sends notification, it waits for the reply which will always be allow and re-trigger the event | YES |
| asynchronous blocking | extension | extension sends notification, it waits for the reply and it allows/blocks according to sensor reply | YES | may trigger a document.execComand ("paste") using the cloned, duplicate copy 82 of the clipboard event 100.

Figure 8:
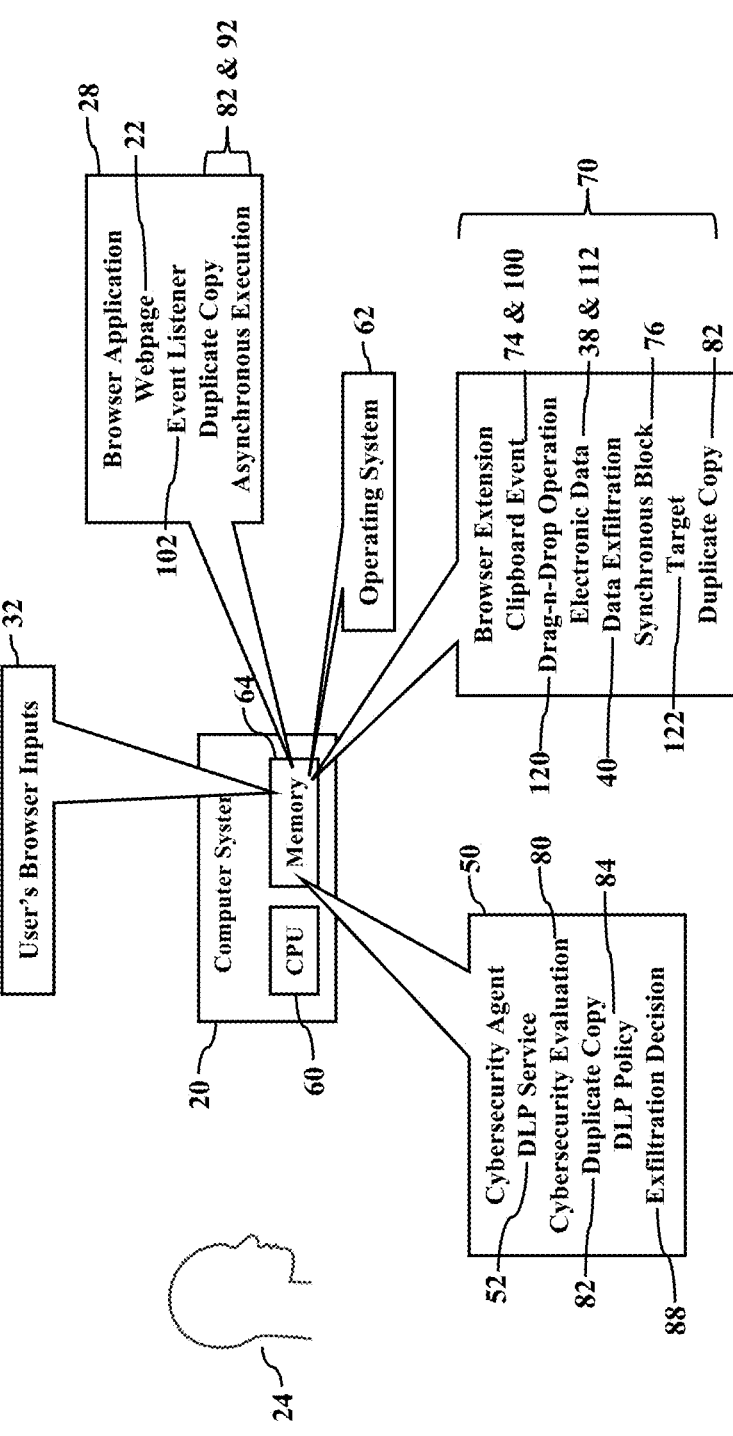

FIG. 8 illustrates still more detailed examples of synchronous blocking, and asynchronous execution, of the clipboard events 100. Here the user's browser input 32 represents the clipboard event 100 to perform a drag-n-drop operation 120 using any electronic data 38 (such as the text 112). The browser application 28 may thus have an HTML or other drag-and-drop interface features or elements. The browser extension 70 captures the electronic data 38 and other data from a drop payload associated with the drag-n-drop operation 120 and/or the clipboard event 100. The browser extension 70 synchronously blocks the clipboard event 100 to immediately prevent any possible data exfiltration 40 of the electronic data 38. The cybersecurity data loss prevention service 52 thus stops all the event listeners 102 from firing on the clipboard event 100. The browser extension 70 simultaneously or nearly simultaneously sends the drag-n-drop operation 120, the clipboard event 100, and/or the electronic data 38 to the cybersecurity agent 50 and may wait for a reply. The cybersecurity agent 50 performs the cybersecurity evaluation 80 using any information associated with the drag-n-drop operation 120, the clipboard event 100, and/or the electronic data 38. The cybersecurity agent 50 sends the exfiltration decision 88 to the browser extension 70. If the user's browser input 32 (representing the clipboard event 100) is confirmed as malicious, then the drag-n-drop of the text 112 has already been blocked and the data exfiltration 40 was previously prevented. If, however, the clipboard event 100 is the normal operation 90 (as illustrated in FIG. 5), then the cybersecurity agent 50 overrides and instructs the browser extension 70 to implement the delayed, asynchronous execution 92 of the clipboard event 100. For example, because the user 24 has attempted to drag-n-drop the text 112, the browser extension 70 determines a target 122 associated with the drag-n-drop operation 120. For example, if the target 122 is an input or text area, the text part triggers a document.execComand ('insertText') with the text part. If the target 122 is an editable div, as another example, the browser extension 70 re-triggers the user's browser input 32 using the cloned, duplicate copy 82 of the clipboard event 100.

Any communications scheme may be implemented. The cybersecurity agent 50 and the browser extension 70 communicate to implement the synchronous blocking 76 and/or the asynchronous execution 92. Indeed, the cybersecurity agent 50 and the browser extension 70 may establish different interactions and communications scenarios, perhaps depending on whether the synchronous blocking 76 and/or the asynchronous execution 92 is/are implemented. The Any communications scheme may be implemented between the cybersecurity agent 50 and the browser extension 70 (such as one-way communication, two-way communications, request/response pairing). Either the cybersecurity agent 50 or the browser extension 70 may initiate communication.

The cybersecurity data loss prevention service 52 further improve computer functioning. The cybersecurity data loss prevention service 52 automatically and synchronously, in real time, prevents the computer system 20 from exfiltrating passwords, credit card numbers, trade secrets, and other sensitive electronic data 38. The cybersecurity data loss prevention service 52 prevents the operating system 62 and/or the browser application 28 from processing and/or executing any pre-defined exfiltration event 74 (such as the clipboard event 100, as specified by the browser extension 70). The cybersecurity data loss prevention service 52 thus automatically and immediately stops the hardware processor 60, the operating system 62, and/or the browser application 28 from revealing or disclosing any electronic data 38.

The cybersecurity data loss prevention service 52, for example, stops inter-domain data transfers. A common exfiltration scheme is when the user 24 maliciously attempts to steal company secrets or other sensitive electronic data 38 using cloud storage (such as GOOGLE DRIVE®, APPLE ICLOUD®, and MICROSOFT ONEDRIVE®). The user 24, for example, attempts to copy/paste/drag/transfer the sensitive electronic data 38 from a company's website domain (e.g., www.company.com/filelocation) to an account associated with a cloud service provider (e.g., www.drive-.google.com/useraccount). When the user 24 attempts to initiate the inter-domain transfer (e.g., the user's browser input 32), the operating system 62, the browser application 28, and/or the cybersecurity agent 50 cooperate to immediately synchronously block 76 any exfiltration event 74 associated with different source/target/destination domains. The cybersecurity data loss prevention service 52 may then have the cybersecurity agent 50 perform the more detailed and thorough asynchronous cybersecurity evaluation 80 (using the cloned, duplicate copy 82 of the exfiltration event 74, as explained with reference to FIGS. 1-8). If, for example, the cloned, duplicate copy 82 violates, or fails to conform to, the data loss prevention policy 84, then perhaps the cybersecurity agent 50 confirms the synchronous block 76 of the exfiltration event 74. Perhaps no further action need be taken, as the attempted inter-domain transfer has already been blocked and defeated/rejected. If, however, the cloned, duplicate copy 82 conforms to the data loss prevention policy 84, then the cybersecurity agent 50 may instruct or cause the browser extension 70 and/or the operating system 62 to implement the user's inter-domain transfer by triggering the cloned, duplicate copy 82 of the exfiltration event 74. The cybersecurity data loss prevention service 52 implements the delayed, asynchronous execution 92 of the cloned, duplicate copy 82. The cybersecurity data loss prevention service 52, in other words, implements delayed execution of the user's browser input 32, but the asynchronous execution 92 may be seconds or minutes later, depending on the time required to perform the cybersecurity evaluation 80.

The cybersecurity data loss prevention service 52, however, may be configured to permit intra-domain data transfers. Suppose the user 24 attempts to copy/paste/drag/transfer the sensitive electronic data 38 from a network location within the company's website domain (e.g., www.company.com/filelocation1) to a different network location still within the company's website domain (e.g., www.company.com/filelocation2). Because the exfiltration event 74 represents an intra-company, intra-domain data transfer, the operating system 62, the browser application 28, and/or the cybersecurity agent 50 cooperate to allow and to execute the exfiltration event 74 associated with the same source/target/destination domain. The browser extension 70, for example, may be optimized to decline the synchronously block 76 of intra-company, intra-domain data transfers, as perhaps the cybersecurity evaluation 80 is unnecessary. The cybersecurity data loss prevention service 52 need only perhaps ensure that the clipboard content in the paste operation 110 represents the same company web domain. The cybersecurity data loss prevention service 52, as another example, may call or interface with any hashing algorithm to generate hash values representing the source and target/destination domains. If the hash values are equal, then the operating system 62, the browser application 28, and/or the cybersecurity agent 50 may determine that the intra-domain transfer is permissible and may synchronously, or nearly synchronously, execute. The caveats, of course, are communications times and the time required by the hardware processor 60 to calculate the hash values. The browser extension 70 and/or the browser application 28, for example, may cooperate with the operating system 62 to request that the hardware processor 60 to calculate the hash values. The hashing, in other words, may be done via the browser application 28 to save some time. The hashing, however, may alternatively be performed by the cybersecurity agent 50, but extra time would be required to send the clipboard content to the cybersecurity agent 50 and to receive the hash values in response.

The cybersecurity data loss prevention service 52 may consider any clipboard event 100 as an exfiltration event 74. The clipboard event 100 may be generated by the browser extension 70, the browser application 28, the cybersecurity agent 50, and/or the operating system 62 and therefore, regardless of the event source, the exfiltration event 74 may be shared with the browser application 28 and/or the cybersecurity agent 50. For example, even though the document.execComand is above explained, the cybersecurity data loss prevention service 52 may be configured or coded to respond to any scheme or mechanism. As another example, the cybersecurity data loss prevention service 52 may respond to application programming interfaces (or APIs) for copy/paste/transfer/move clipboard operations such as navigator.clipboard. As yet another example, should the operating system 62 notify the cybersecurity agent 50 of an API paste request, the cybersecurity agent 50 may instruct the operating system 62 to hold or defer the API paste request.

The cybersecurity agent 50 may then notify the browser extension 70 (such as for the drag-n-drop operations 120). The cybersecurity agent 50, in other words, may issue the exfiltration event 74, rather than the browser extension 70 or the browser application 28. Indeed, having the cybersecurity agent 50 issue the exfiltration event 74 may be a desirable fallback position or mechanism, in case that execCommand could be deprecated in the future. Simply put, if the browser extension is unable to trigger the synthetic clipboard event after it was allowed by the cybersecurity agent 50, this may also be executed by the cybersecurity agent 50 or to other actors delegated by the cybersecurity agent 50 (for example browser application 28, operating system 62 etc.)

Figure 9:
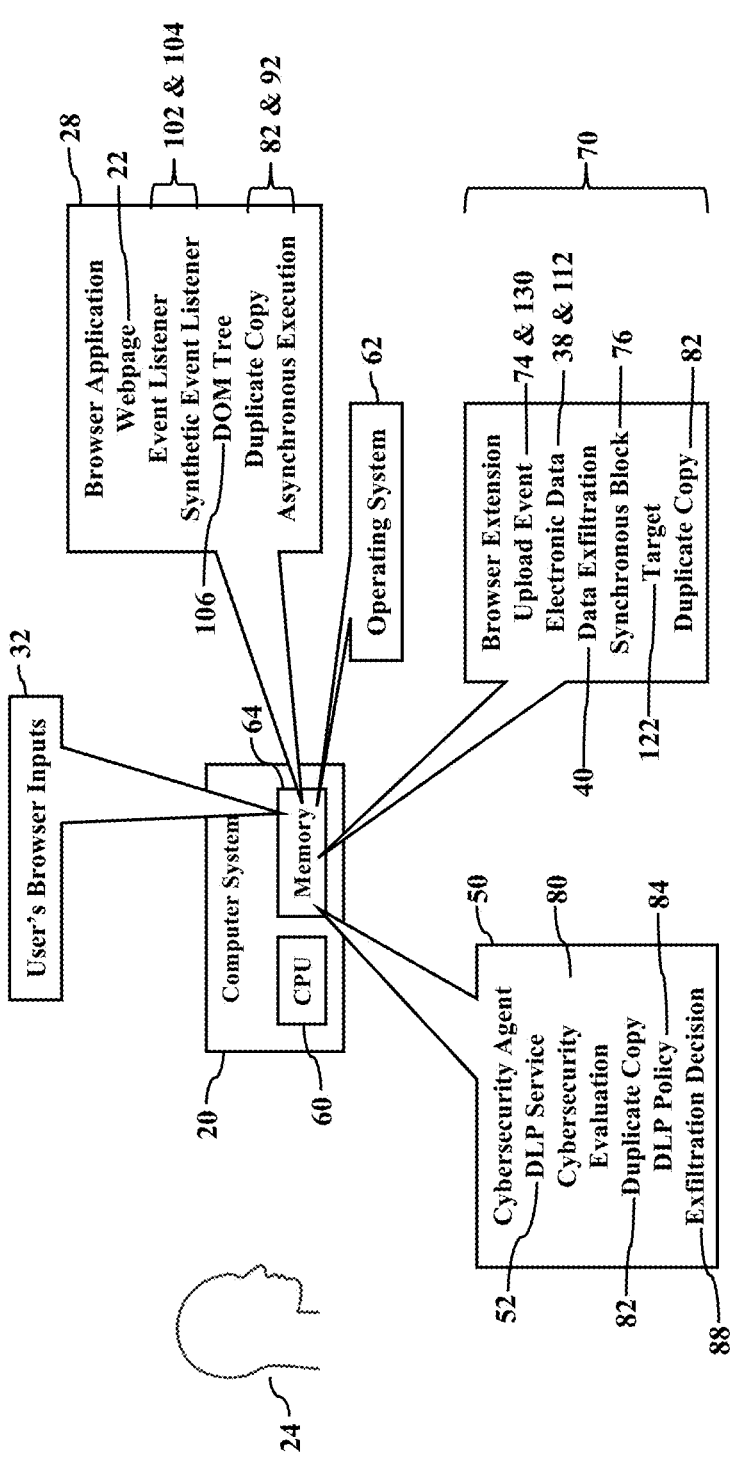
FIG. 9 illustrates examples of synchronous blocking, and asynchronous execution, of upload events.

FIG. 9 illustrates examples of the synchronous blocking 76, and the asynchronous execution 92, of upload events 130. The cybersecurity data loss prevention service 52 may block the user's browser inputs 32 that attempt to upload sensitive files, images, and any other electronic data 38. The user 24 of the browser application 28, for example, may enter the browser input 32 that attempts to specify a file, folder, or other file type. The user 24 may also enter the browser input 32 that attempts to drag-n-drop on a selected area within the webpage 22. The user 24 may also enter the browser input 32 that attempts to copy-n-paste a file operation (although this operation is rarely available for security concerns, as users often paste files by mistake). These upload events 130, as further examples of the exfiltration event 74, may be blocked to prevent the data exfiltration 40. The browser extension 70 intercepts the upload event 130 that triggers the file handle movement and, more specifically, the change event for input and drop event for drag and drop. The cybersecurity data loss prevention service 52 may thus block upload events 130 via synchronous blocking 76 without getting permission from the cybersecurity agent 50 (perhaps according to upload blocking conditions specified by the browser extension 70 and/or the data loss prevention policy 84). The cybersecurity data loss prevention service 52 may additionally or alternatively block upload events 130 via asynchronous blocking after getting permission from the cybersecurity agent 50.

As previously explained, the cybersecurity data loss prevention service 52 may synchronously block 76 any exfiltration event 74. The cybersecurity agent 50 installs the browser extension 70. The browser extension 70 blocks all types of the upload event 130, as another example of the exfiltration event 74, from reaching the real event listener 102 associated with the browser application 28. The browser extension 70 may inject the event listener 104 at the highest level in the DOM tree 106 and stops the upload event 130 at capture phase.

The browser extension 70, at or nearly the same time, messages the cybersecurity agent 50. The browser extension 70 generates and sends the cloned, duplicate copy 82 of the upload event 130 to the cybersecurity agent 50. The browser extension 70 may then asynchronously await the cybersecurity evaluation 80 performed by the cybersecurity agent 50. The cybersecurity agent 50 may locally compare the cloned, duplicate copy 82 of the exfiltration event 74 to the data loss prevention policy 84. The cybersecurity agent 50 may additionally or alternatively consult the remote cloud computing environment 86 (as explained with reference to FIG. 3). Whatever the cybersecurity evaluation 80, the cybersecurity agent 50 send the exfiltration decision 88 back to the browser extension 70 (perhaps via the operating system 62).

The asynchronous execution 92 may then be performed. All asynchronous executions 92 are executing after the main thread has executed, meaning that the DOM-below event listeners (e.g., at hierarchically lower levels than the event listener 102) will fire and the upload event 130 will reach its intended target (e.g., the browser application 28) before the reply from asynchronous task. The amount of time to wait for the exfiltration decision 88 (from the cybersecurity agent 50) may be configured as irrelevant to ensure full completion of the cybersecurity evaluation 80. Because the browser extension 70 synchronously and initially blocks all types of the upload event 130, all events listeners 102 are stopped from firing. If the exfiltration decision 88 confirms the synchronous blocking 76 (i.e., the upload event 130 is malicious), no action need be taken, as the upload event 130 has already been blocked and thwarted. If, however, the exfiltration decision 88 indicates that the user's browser input 32 should be allowed, then the browser extension 70 triggers the cloned, duplicate copy 82 of the exfiltration event 74. The cloned, duplicate copy 82 thus represents a recreated payload (simulating another upload event 130 is happening using the cloned, duplicate copy 82). The upload event 130 fired. The cybersecurity data loss prevention service 52 injects a ponyfill in the main world which will serve the above pointers when the browser application 28 will try to read the data from the synthetic event (e.g., the cloned, duplicate copy 82) (which would normally be empty for folders). The cybersecurity data loss prevention service 52, for each level 1 folder, may create a dummy file that would allow the ponyfill to reference a folder pointer.

Any communications scheme may be implemented. The cybersecurity agent 50 and the browser extension 70 communicate to implement the synchronous blocking 76 and/or the asynchronous execution 92. Indeed, the cybersecurity agent 50 and the browser extension 70 may establish different interactions and communications scenarios, perhaps depending on whether the synchronous blocking 76 and/or the asynchronous execution 92 is implemented. The below table, for example, summarizes the communications between the cybersecurity agent 50 and the browser extension 70, depending on the blocking action and blocking actor.

| Extension action | Blocking actor | Remarks | 2way comm needed |
|---|---|---|---|
| synchronous notification | Agent | extension will only send notification about the event, without waiting for reply | NO |
| synchronous blocking | extension | blocking condition must be known in advance, on initial handshake or on configuration update | YES |
| asynchronous pending | Agent | extension sends notification, it waits for the reply which will always be allow and re-trigger the event | YES |
| asynchronous blocking | extension | extension sends notification, it waits for the reply and it allows/blocks according to sensor reply | YES | browser extension 70 may generate the cloned, duplicate copy 82 by recreating the payload. For example, for a file type input upload, the input element keeps reference inside it to the selected root folder and the files to be uploaded have a property that reflects the relative path. Thus, recreating the payload would mean just to reiterate through all files in the upload event and copy the files to a new dataTransfer payload of the new event (e.g., the cloned, duplicate copy 82).

As another example, a drag-n-drop upload event 130 is more complicated to recreate a drop payload event. When the user 24 drags-n-drops files/folders, a container is created by the operating system 62 and passed to the browser application 28. To prevent the user 24 from selecting arbitrary files from any location in a disk, the browser creates an internal filesystem which has the root as the selected folder root (imagine a shared network folder). This container is accessible to the browser application 28 only on the drop event, in order to prevent malicious users to tamper with the structure. As soon as the drop operation completes, the container is released and the links are gone. This means that the cybersecurity data loss prevention service 52 may not be able to copy the data from the reference of the dataTransfer for the cloned, duplicate copy 82, because, after the original upload event 130, that reference will no longer exist. Also, because the exfiltration events 74 are set in the isolated world of the web browser application 28, where the main world (or app world) cannot interfere, so the cybersecurity data loss prevention service 52 also cannot enter directly from the isolated world. Instead, the cybersecurity data loss prevention service 52 adds a drop event in the main world which will just create pointers to/from level 1 items of the dataTransfer. A pointer to the event payload may not be created, because this would be discarded after the original Still more examples are provided. The browser extension 70 may read a specific number of bytes from each file, which will help uniquely identify the tab (and, thus, the URL, username, and other data) which asked for the upload event 130. The upload event 130 may then send the number of bytes read for that event. The number of bytes read will be cycled from some queue (like from 5 to 20 bytes), ensuring that the within a number of upload events (such as 15), the browser extension 70 will always read a different number of bytes. This will prevent a corner case which will happen if the user 24 consecutively drops the same folder with a very large number of files between two (2) different tabs, creating a possible race event between tabs actual upload (file read) while the cybersecurity agent 50 didn't fully process the files metadata.

Even more examples are provided. Still, the cybersecurity data loss prevention service 52 may intercept, block, and re-trigger any and all upload types.

Figure 10:
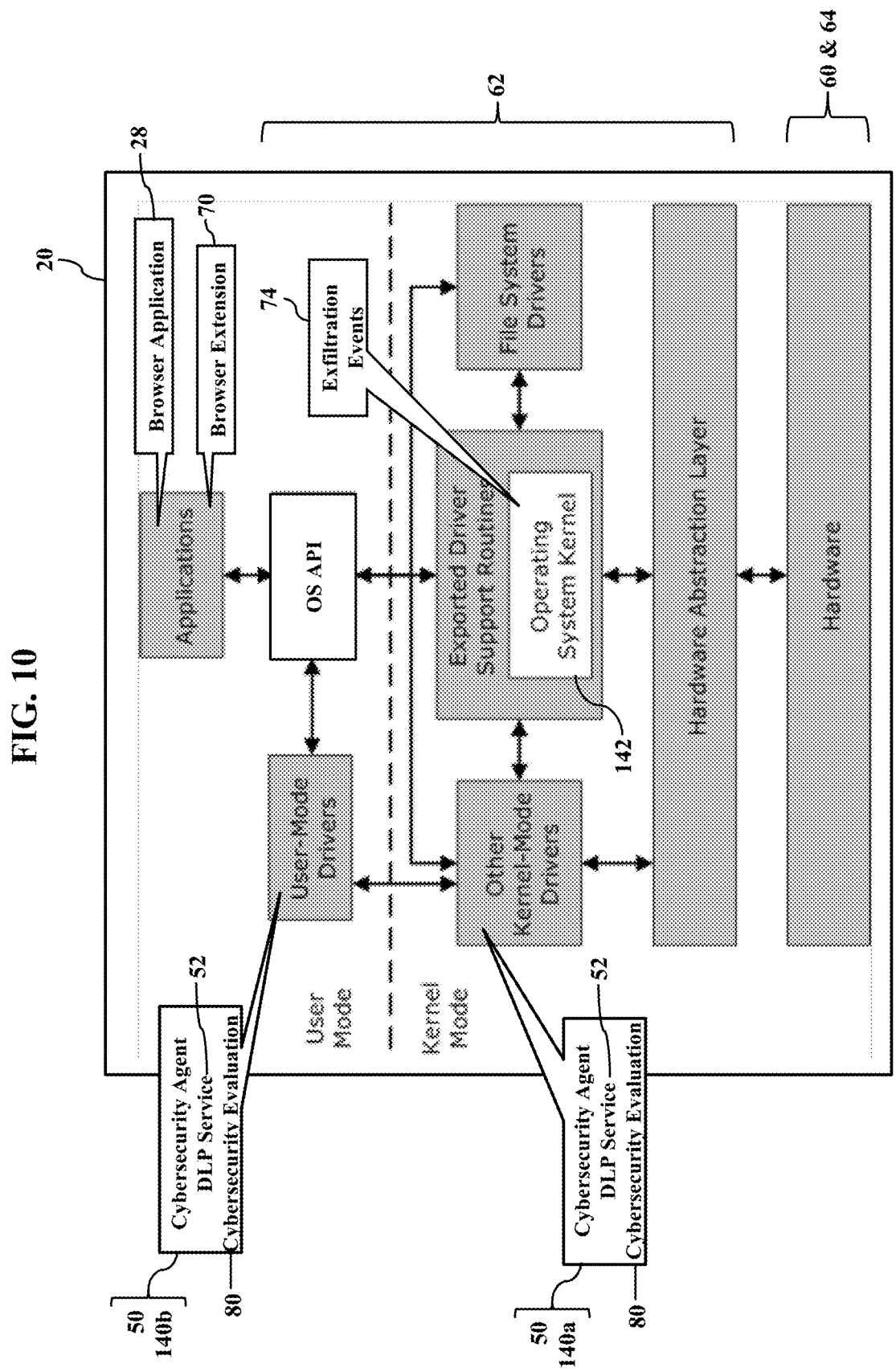
FIG. 10 illustrates examples of the endpoint cybersecurity agent.

FIG. 10 illustrates more examples of the endpoint cybersecurity agent 50. The operating system 62 may interface with the cybersecurity agent 50 as an antimalware driver. The cybersecurity agent 50 is installed on the computer system 20, is stored by the memory device 64, and is executed by the hardware processor 60. Because the cybersecurity agent 50 registers with the operating system 62 as the antimalware driver, the cybersecurity agent 50 may have kernel-level components 140a having kernel-level permissions to the kernel 142 of the operating system 62. The cybersecurity agent 50 may additionally have user-mode components 140b having user-level permissions to a user mode of the operating system 62. The cybersecurity agent 50 may include computer program, code, or instructions that scan and/or monitor the computer system 20 for the exfiltration events 74 (such as communications, processes, activities, behaviors, data values, usernames/logins, locations, contexts, and/or patterns) associated with the browser extension 70, the browser application 28, and/or the operating system 62. Because the endpoint cybersecurity agent 50 has kernel-level permissions, the endpoint cybersecurity agent 50 may monitor any kernel-level activity and/or any user-mode activity conducted by the computer system 20. The endpoint cybersecurity agent 50 may register for and receive kernel-level notifications and call backs from the kernel 142 associated with the exfiltration events 74. The endpoint cybersecurity agent 50 and/or the browser extension 70 may thus register for and receive event notifications of the exfiltration events 74.

Figure 11:
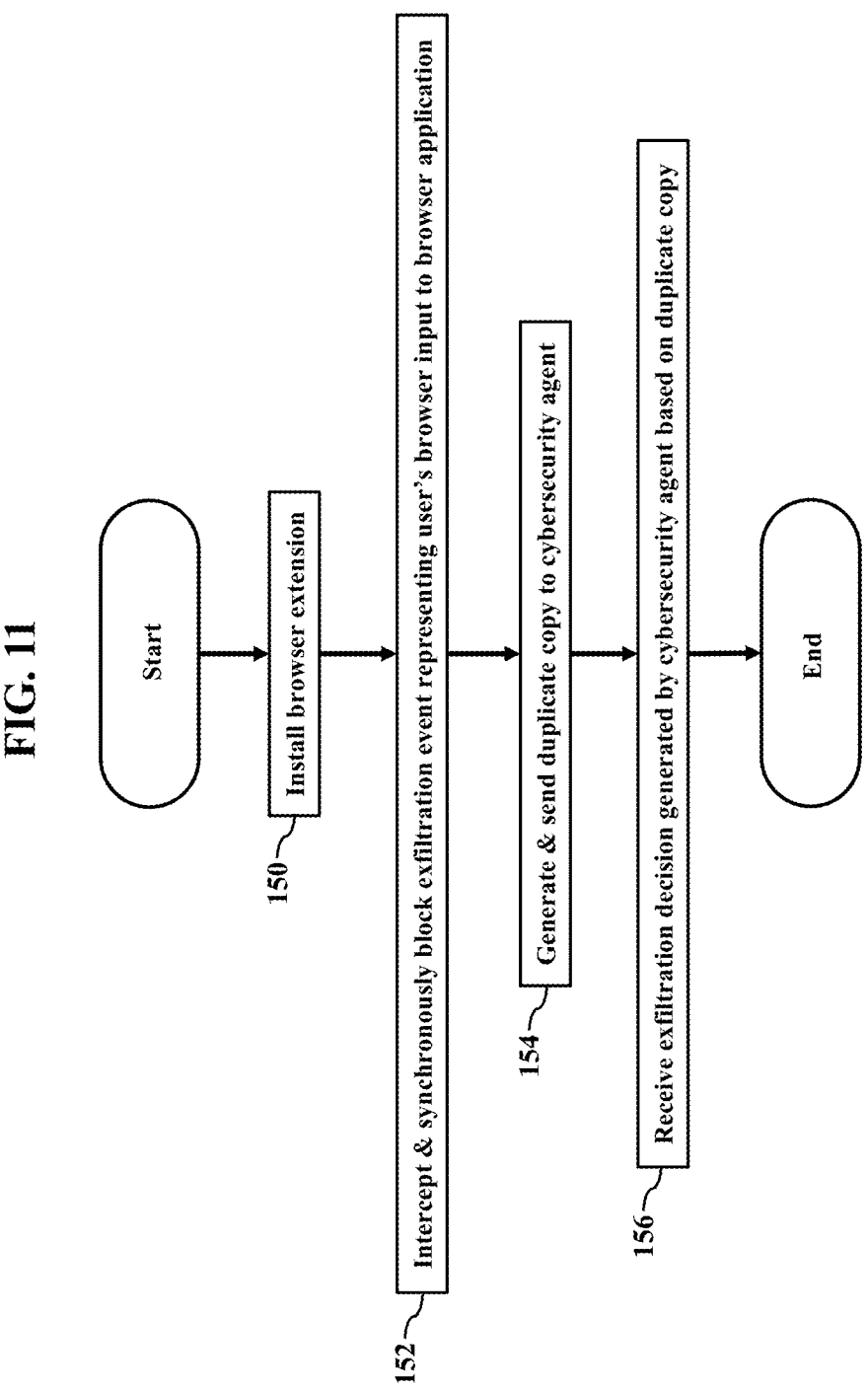
FIG. 11 illustrates examples of methods or operations that assess the exfiltration event.

FIG. 11 illustrates examples of methods or operations that assess the exfiltration event 74. The endpoint cybersecurity agent 50 coordinates the installation of the browser extension 70 to the computer system 20 (Block 150). The browser extension 70 intercepts and synchronously blocks the exfiltration event 74 representing the user's browser input 32 to the browser application 28 (Block 152). The browser extension 70 sends the duplicate copy 82 of the exfiltration event 74 to the endpoint cybersecurity agent 50 (Block 154). The browser extension 70 receives the exfiltration decision generated by the endpoint cybersecurity agent 50 based on the duplicate copy 82 of the exfiltration event 74 (Block 156).

Figure 12:
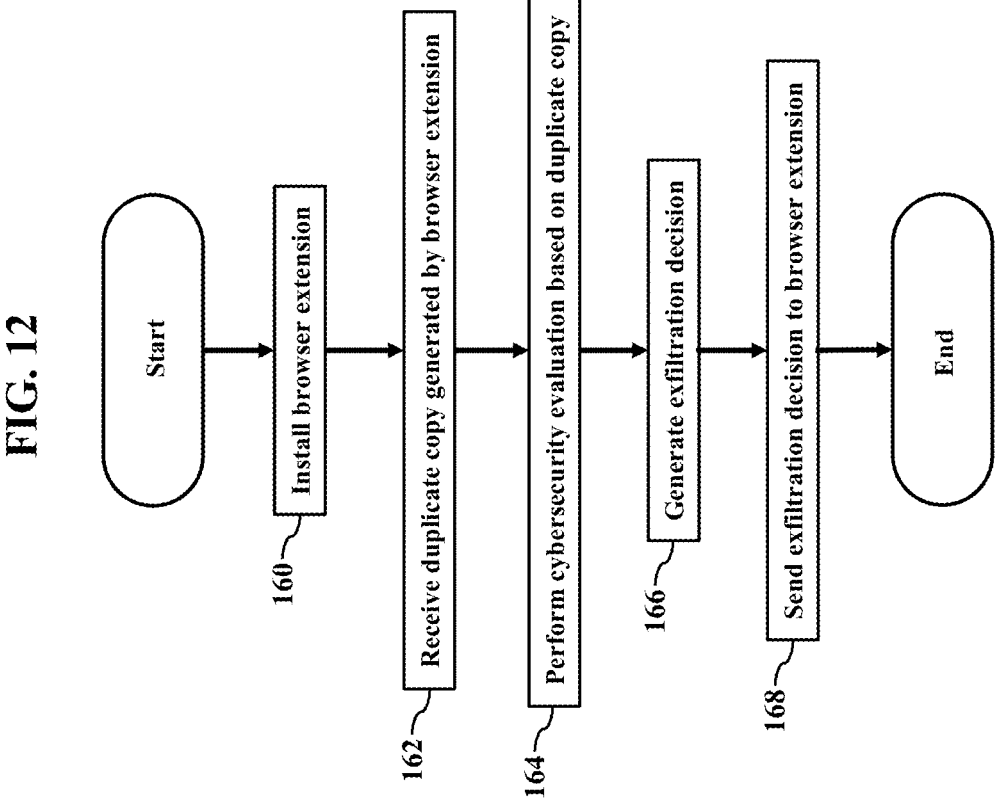
FIG. 12 illustrates more examples of methods or operations that assess the exfiltration event.

FIG. 12 illustrates more examples of methods or operations that assess the exfiltration event 74. The endpoint cybersecurity agent 50 coordinates the installation of the browser extension 70 (Block 160). The endpoint cybersecurity agent 50 receives the duplicate copy 82 of the exfiltration event 74 generated by the browser extension 70 (Block 162). The endpoint cybersecurity agent 50 performs the cybersecurity evaluation 80 based on the duplicate copy 82 (Block 164) and generates the exfiltration decision 88 (Block 166). The endpoint cybersecurity agent 50 sends the exfiltration decision 88 to the browser extension (Block 168).

Figure 13:
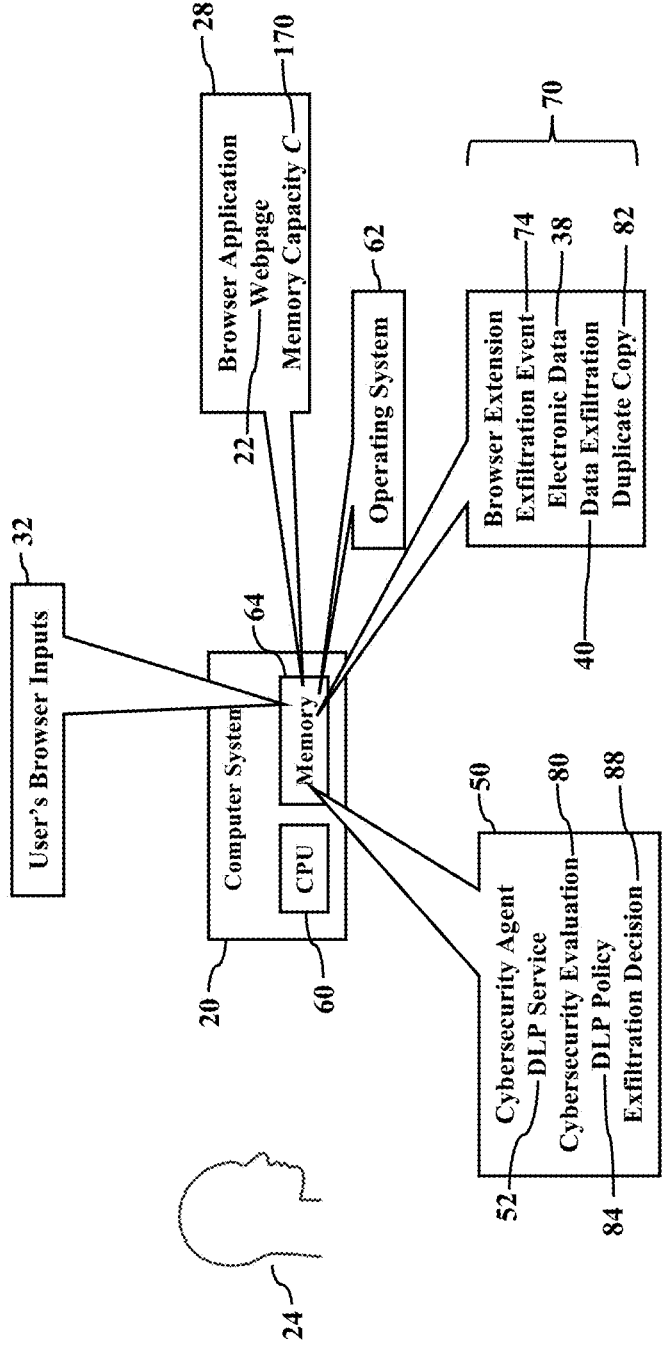
FIG. 13 illustrates examples of memory management.

FIG. 13 illustrates examples of memory management. This disclosure restricts the user 24 from sending the unsanctioned electronic data 38 via the webpage 22 generated by the browser application 28. The browser extension 70 intercepts and synchronously blocks the exfiltration event 74 (as above explained). The browser extension 70 sends the electronic data 38 to the cybersecurity agent 50 and waits for a response (e.g., the exfiltration decision 88). The cybersecurity data loss prevention (or "DLP") service 52 may specify the final denial/block or the cloned re-trigger, based on the exfiltration decision 88. The cybersecurity data loss prevention service 52 thus blocks any exfiltration events 74 (such as paste and upload, as previously explained), as the exfiltration events 74 are common schemes for the data exfiltration 40. For example, the user 24 can drop text and it is regarded as paste (as explained with reference to FIG. 7). As another example, the user 24 may copy files from a file manager and paste them in the webpage 22. Regardless, the user's malicious action is happening via the webpage 22, and the browser application 28 and/or the browser extension 70 is/are handling the exfiltration events 74.

The duplicate copy 82 and/or the exfiltration event 74, though, may exceed memory limitations. The operating system 62 and the browser application 28 cooperate to allocate a fixed byte amount of the memory device 64 for use by the browser application 28. The browser application 28, in other words, may only utilize a memory capacity C (illustrated as reference numeral 170). The browser application 28 may thus not consume or utilize more than the memory capacity C (e.g., an imposed memory constraint or limit). The exfiltration event 74, though, may cause the browser application 28 to exceed the memory capacity C. The exfiltration event 74, for example, involves a copy/paste/transfer/move of the electronic data 38. A file, image, text, or any other electronic data 38 must therefore be read from the original exfiltration event 74 and at least temporarily stored to the memory device 64, thus consuming the memory capacity C allocated to the browser application 28. Moreover, the cloned, duplicate copy 82 of the exfiltration event 74 may also be generated and stored, which may additionally consume more bytes from the memory capacity C allocated to the browser application 28. In addition, any passing of the electronic data 38 from the main world to the isolated world of the browser application 28 (and vice versa) may consume still more bytes from the memory capacity C allocated to the browser application 28. Blocking, copying, and analyzing the exfiltration event 74 may thus cause the browser application 28, and/or the browser extension 70, to attempt to consume more than, or exceed, the allocated memory capacity C, thus causing errors and crashes.

The cybersecurity data loss prevention service 52, however, protects the memory capacity C (illustrated as reference numeral 170) allocated to the browser application 28. By ingeniously and elegantly generating the cloned, duplicate copy 82, the cybersecurity data loss prevention service 52 need only acquire minimal data representing the exfiltration event 74. The cybersecurity data loss prevention service 52, for example, need not copy files to be uploaded, which would conventionally greatly consume the memory capacity C. The cybersecurity data loss prevention service 52, instead, need only identify the filename(s), byte size(s), and timestamp(s) associated with the upload files. Similarly, the files to be uploaded need not be copied and sent to the cybersecurity agent 50, which would conventionally greatly consume the memory capacity C. Again, the cybersecurity data loss prevention service 52, instead, need only identify the filename(s), byte size(s), and timestamp(s) associated with the upload files. Moreover, the cybersecurity agent 50 evaluates the cloned, duplicate copy 82, and generates the exfiltration decision 88, by consuming little, if any, memory capacity C 170 allocated to the browser application 28. Blocking, copying, and analyzing the cloned, duplicate copy 82 of the exfiltration event 74 consumes very little of the memory capacity C 170 allocated to the browser application 28.

Figure 14:
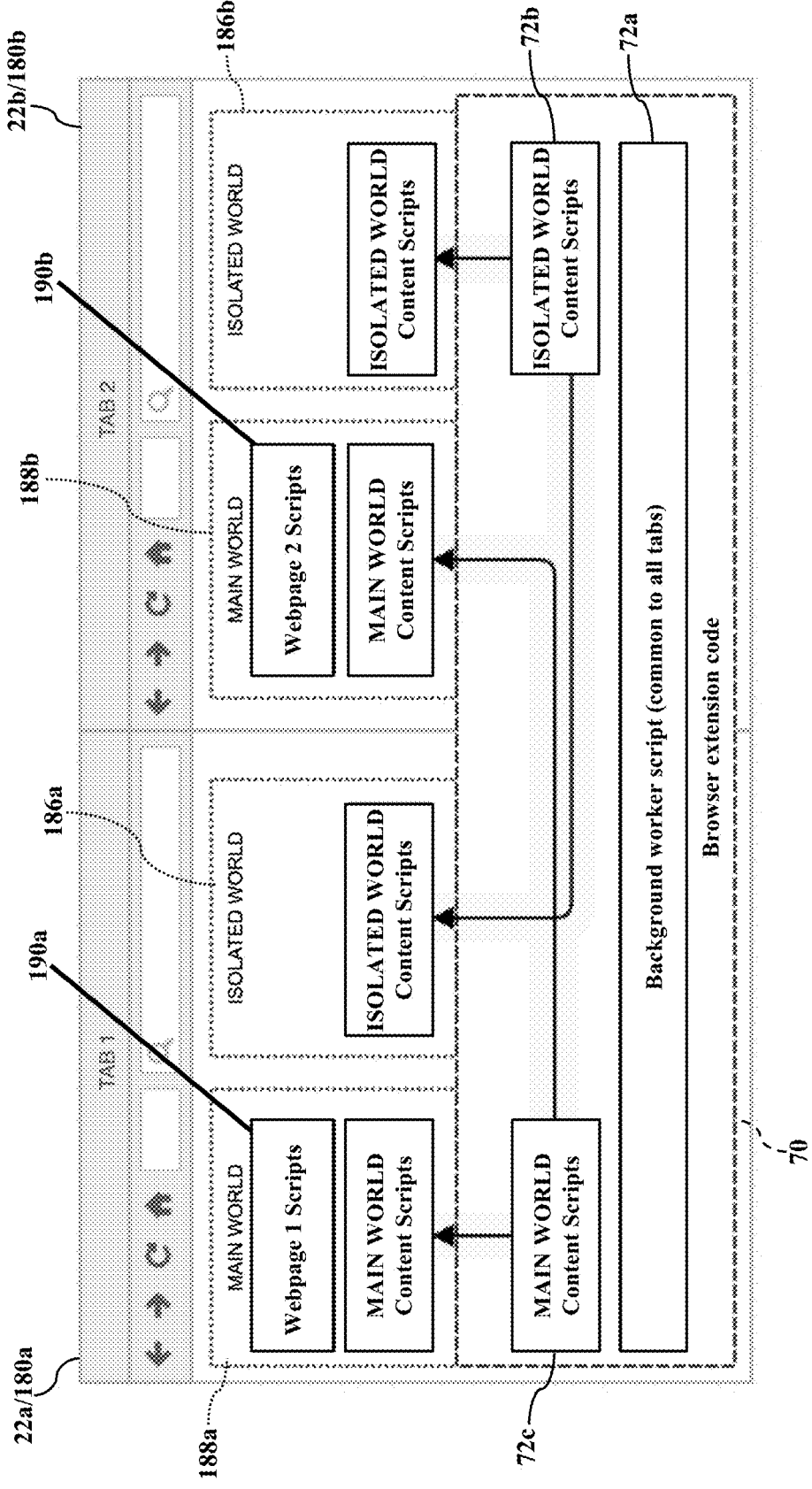
FIG. 14 illustrates examples of scripting.

FIG. 14 illustrates examples of scripting. The cybersecurity data loss prevention service 52 (illustrated in FIGS. 1-10) installs the browser extension 70. The browser extension 70 adds one or more of the content scripts 72 that add features or functions to the webpage 22 (such as monitoring for the exfiltration events 74, as explained with reference to FIGS. 1-13). FIG. 14, for example, illustrates three (3) types of content scripts (illustrated as reference numerals 72a-c) that the browser extension 70 may implement. The browser extension 70 may inject a Background worker script 72a, one or more isolated world scripts 72b, and/or one or more main world scripts 72c. The Background worker script 72a, for example, is a single instance for the whole browser application 28, no matter how many tabs 180 are open. The Background worker script(s) 72a is/are used to communicatively connect to the external cybersecurity agent 50 (illustrated in FIGS. 1-13). The content scripts 72 may be injected into every webpage 22, in every tab 180. There may be some rules, though, that filter which content scripts 72 are injected into what webpage 22 or tab 180. However, because the cybersecurity data loss prevention service 52 prefers to monitor the exfiltration events 74 in every webpage/tab 22/180, the browser extension 70 preferably injects its content scripts 72a-c into every webpage/tab 22/180. These content scripts 72a-c thus alter the behavior of the webpage(s) 22. The content scripts 72b-c may be injected either or both of the isolated world 184 or the main world 186. The main world 186 is where the webpage 22 runs. Any variable set by the webpage scripts (illustrated as reference numerals 190a-b) can be read by the content script(s) 72 and vice versa. The cybersecurity data loss prevention service 52, though, may decline to inject into the main world 186, because it can be easily altered by the end user 24 (illustrated in FIGS. 1-10) and variables can leak creating issues. The isolated world 184 may thus be the default world where the content scripts 72 are injected. The document object model (or DOM) tree 106 (such as HTML/CSS, illustrated in FIGS. 6-7 & 9) of the webpage 22 may be modified from here, but variables from one world may not be changed from another one (e.g., main< >isolated). The isolated world 184 is used to communicate to the background worker script 72a (and hence sends any data to the cybersecurity agent 50).

Figure 15:
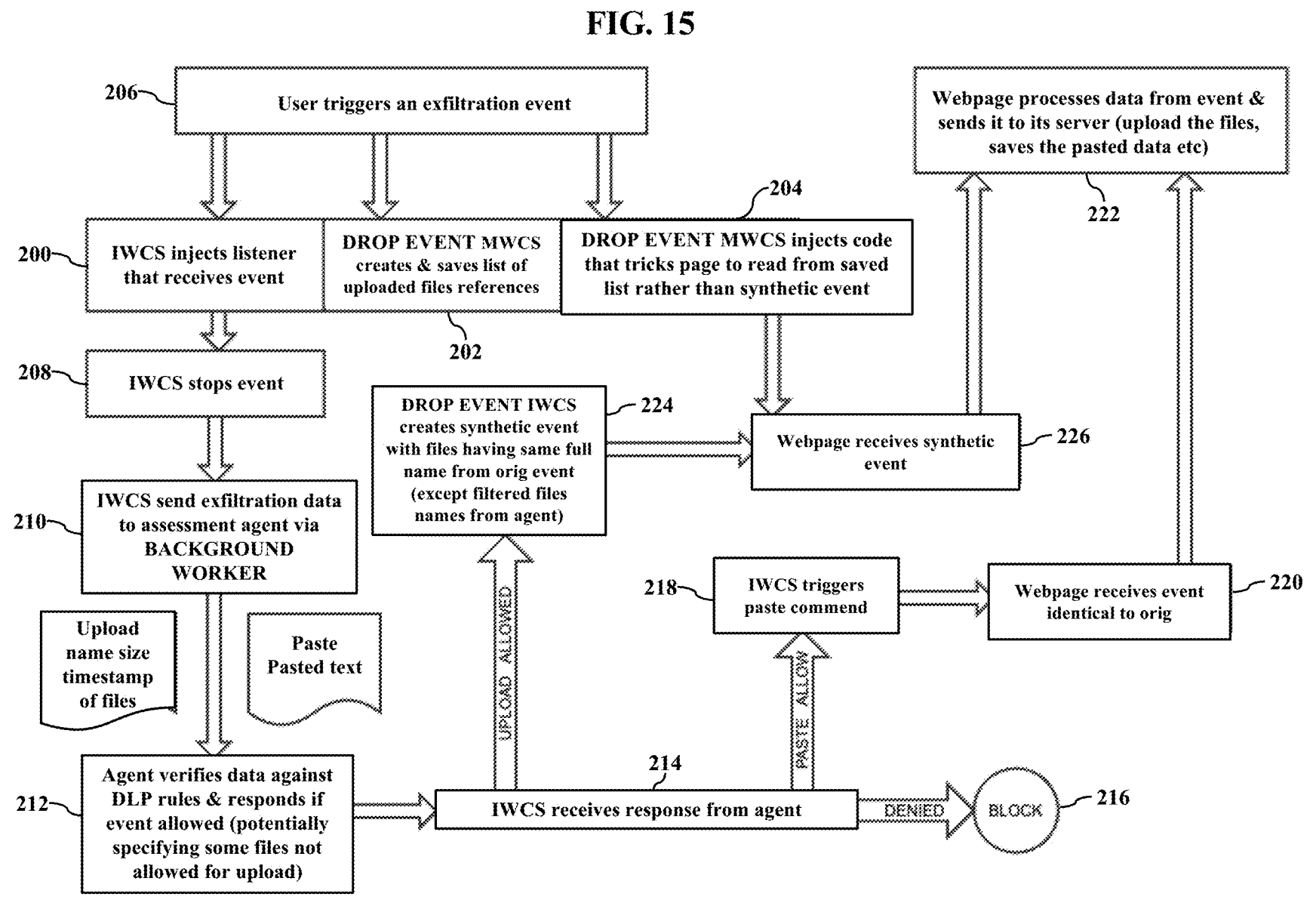

FIG. 15 illustrates yet more examples of methods or operations that block and evaluate the exfiltration event 74. The browser extension 70 injects the contents scripts 72 (e.g., illustrated as isolated world content scripts or "IWCS") which register exfiltration events listeners in the isolated world 184 (the page at capture phase at document/window level, which is the highest level) (Block 200). For a drop upload, the content scripts 72 also register in the main world 186 (e.g., illustrated as main world content scripts or "MWCS") an event listener which creates a list of file references from the exfiltration event 74 (Block 202). For drop upload, the content scripts 72 inject in the main world 186 a modified function that reads file data from the list of file references instead of the event data, if the exfiltration event 74 is synthetic (e.g., the cloned, duplicate copy 82) (Block 204). When the user 24 triggers any of the exfiltration events 74 (Block 206), the events listeners (both for upload and paste) stops the event flow to reach the webpage 22 (Block 208). The IWCS sends the exfiltration data to the cybersecurity agent 50 (Block 210). For example, if the exfiltration event 74 is the clipboard event 100 (such as a paste event), then the IWCS sends the pasted text. As another example, if the exfiltration event 74 is a file upload event, then the IWCS sends the filename(s), byte size(s), and timestamp(s) of the files. The cybersecurity agent 50 will determine which are the files accessed and read their content, not the extension. The cybersecurity agent 50 resolves whether the exfiltration content passes or fails the data loss prevention policy 84 (Block 212) and sends back the exfiltration decision 88 (perhaps as an ALLOW/BLOCK response) (Block 214). The exfiltration decision 88 may further specify a list of blocked files to be filtered out by the browser extension 70 (as Block 212 illustrates). For example, if the cybersecurity agent 50 blocks the exfiltration, IWCS receives a BLOCK and the exfiltration/clipboard event 74/100 is confirmed denied and blocked (Block 216). Again, because the exfiltration event 74 was previously synchronously blocked (e.g., Block 208), no further processing is necessary. If, however, the IWCS receives an ALLOW from the cybersecurity agent 50 (e.g., Block 214), then for paste events the exfiltration decision 88 triggers a paste command (Block 218) which causes the webpage 22 to receive the real clipboard content, just like the original content (albeit using the cloned, duplicate copy 82 of the clipboard event 100) (Block 220). The web browser application 28 thus processes the synthetic event (e.g., the cloned, duplicate copy 82) to asynchronously execute the user's browser input 32 (Block 222).

For input upload (from input type files), the synthetic event (e.g., the cloned, duplicate copy 82) can be recreated from the original file change event (excluding the files blocked by the cybersecurity agent 50, if any) (Block 224). For drop upload, the synthetic event (e.g., the cloned, duplicate copy 82) will have fake/pseudo/synthetic files with the same filename as the ones from the original exfiltration event 74 (excluding the files blocked by cybersecurity agent 50, if any). However, when the webpage 22 processes the synthetic event (e.g., the cloned, duplicate copy 82), the code injected in Block 204 will serve the webpage 22 and/or the web browser application 28 the files from the main world list instead of the original exfiltration event 74. The webpage 22 and/or the web browser application 28 receives the synthetic event (e.g., the cloned, duplicate copy 82) (Block 226) and proceeds to processing (uploading the files, saving pasted data, etc.) (Block 222).

The cybersecurity agent 50 and the browser extension 70 perform the fast and effective data loss prevention service 52. When the cybersecurity agent 50 receives the cloned, duplicate copy 82, the computer system 22 executes the cybersecurity agent 50 as a predictor engine. The computer system 22 may ingest the cloned, duplicate copy 82 as an input, and the cybersecurity agent 50 instructs the computer system 22 to compare data representing the cloned, duplicate copy 82 to any profile, data ranges/values, logical rules, or other evaluation metric or scheme (such as the data loss prevention policy 84). As an example, the data loss prevention policy 84 may statistically define or specify process events, communications, activities, behaviors, data values, patterns, contextual login/location, or other electronic content specifying the safe or normal operation 90. The cybersecurity assessment profile 50, in other words, may describe normal or harmless behaviors, identities, locations, or other data as determined by analysis of historical usage. The data loss prevention policy 84 may represent historical machine and/or human analysts' confirmations or observations of information, data, bits/bytes, and/or other electronic content that is/are known to indicate normal operation 90. Whatever information or data is described by, or included with, the data loss prevention policy 84, that information or data may be compared to the cloned, duplicate copy 82 of the exfiltration event 74. If the electronic content represented by the cloned, duplicate copy 82 equals, matches, satisfies, lies within, or conforms to the data loss prevention policy 84, then the cybersecurity agent 50 may determine that the cloned, duplicate copy 82 is safe or normal operation 90. That is, the user's browser input 32 is actually normal or harmless behaviors, identities, locations, or other data, as specified by the data loss prevention policy 84. The user's browser input 32, in other words, is a false alarm and lacks maliciousness.

The data loss prevention policy 84 may statistically identify the safe or normal operation 90. The data loss prevention policy 84 may be built by a machine learning model. The machine learning model may statistically predict a range of the safe or normal operation 90. The data loss prevention policy 84, in other words, may specify names, processes, and/or values that describe ranges of the safe or normal operation 90, such as terms defining normal or expected process events, communications, activities, behaviors, data values, patterns, contextual login/location, or other electronic content. These terms, associated with the safe or normal operation 90, may derive from human and/or machine cyber security subject matter experts scrutinizing thousands or millions of historical exfiltration events 74. As a simple example, the machine learning model may generate the data loss prevention policy 84 as a profile using Gaussian probability distributions based on cyber security exfiltration training data. One or more standard deviations and confidence intervals may then be calculated to predict ranges of the safe or normal operation 90. As the cybersecurity agent 50 inspects the current cloned, duplicate copy 82, the statistical models may be used to predict that the cloned, duplicate copy 82 lies within, or deviates or differs from, the data loss prevention policy 84.

Computer functioning is greatly improved. Malicious browser usage steals the sensitive electronic data 38. The installed browser extension 70 thus immediately and synchronously blocks the exfiltration event 74 to prevent the data exfiltration 40. The user's browser input 32 is dropped and discarded from processing to protect the sensitive electronic data 38. The cybersecurity agent 50 and the browser extension 70 thus prevent the web browser application 28, and/or the operating system 62, from executing the exfiltration event 74 representing the user's browser input 32. The data loss prevention service 52 is very fast and very simple to execute. The cybersecurity agent 50 and the browser extension 70 consume comparatively little space (in bits/ bytes) in the memory device 64. Moreover, because comparisons may be simple logical statements, the hardware processor 60 requires less cycles and less time to perform operations representing the cybersecurity evaluation 80. Computer resources are reduced, and less electrical power is required to classify the cloned, duplicate copy 82 as malicious or the normal operation 90. The data loss prevention service 52 is thus very fast and very simple, allowing the endpoint computer system 20 to quickly assess the user's browser input 32, perhaps within just a few or several seconds. The data loss prevention service 52 thus greatly improves computer functioning of the computer system 20 to detect and prevent data theft.

Figure 16:
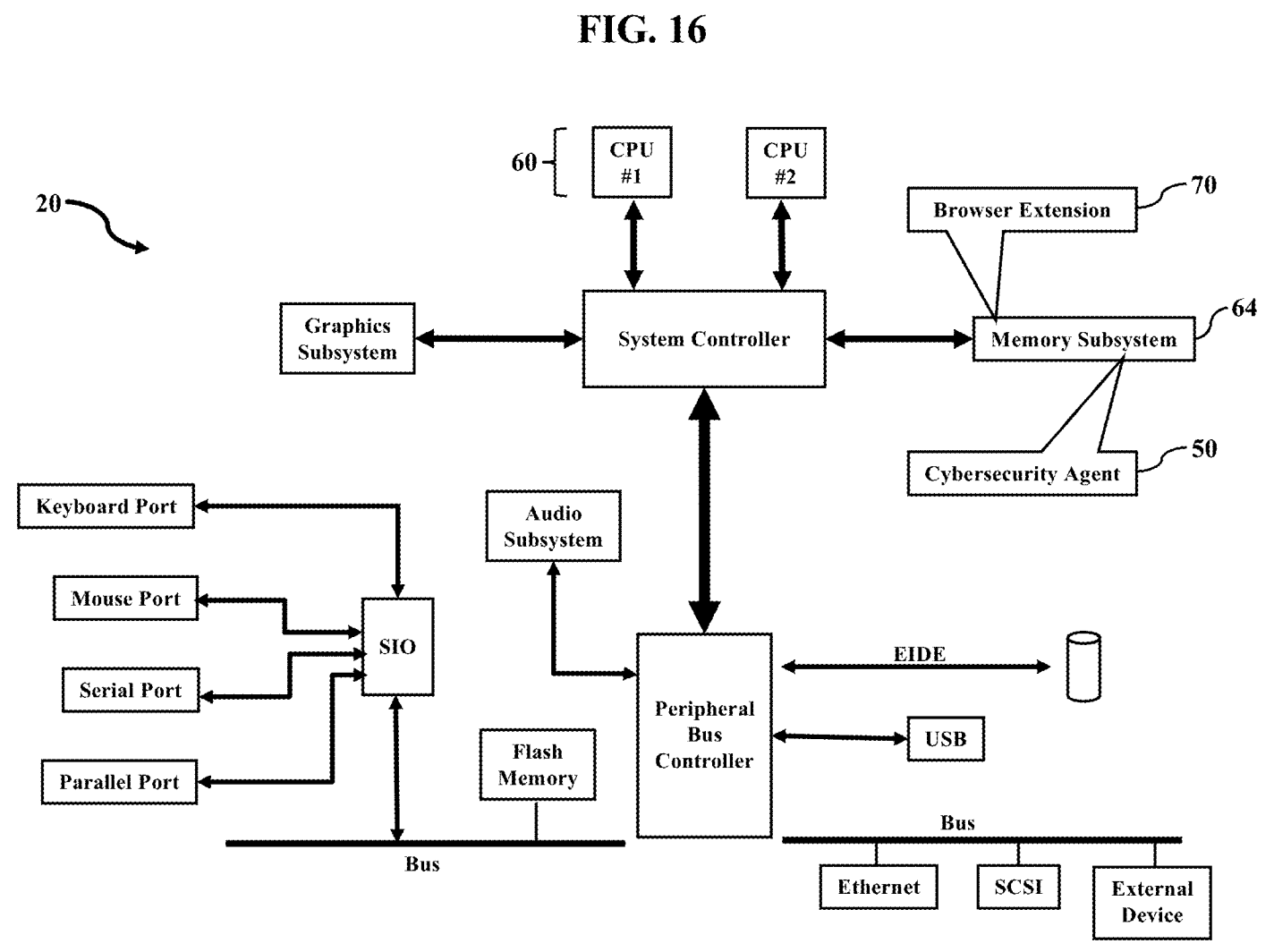

FIG. 16 illustrates a more detailed example of the operating environment. FIG. 16 is a more detailed block diagram illustrating the computer system 20. The cybersecurity agent 50 and the browser extension 70 are stored in the memory subsystem or device 64. One or more of the hardware processors 60 communicate with the memory subsystem or device 64 and execute the cybersecurity agent 50 and the browser extension 70. Examples of the memory subsystem or device 64 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer system 20 is known, no detailed explanation is needed.

The computer system 20 may have any embodiment. This disclosure mostly discusses the computer system 20 as the laptop 26 and as the mobile smartphone 78. The data loss prevention service 52, however, may be easily adapted to any other processor-controlled device, such as a server, a switch, a router, a modem, a tablet computer, or a smartwatch. The data loss prevention service 52 may also be easily adapted to other embodiments of smart devices, such as a television, an audio device, a remote control, and a recorder. The data loss prevention service 52 may also be easily adapted to still more smart appliances, such as washers, dryers, and refrigerators. Indeed, as cars, trucks, and other vehicles grow in electronic usage and in processing power, the data loss prevention service 52 may be easily incorporated into any vehicular controller.

The above examples of the data loss prevention service 52 may be applied regardless of the networking environment. The data loss prevention service 52 may be easily adapted to stationary or mobile devices having wide-area networking (e.g., 4G/LTE/5G cellular), wireless local area networking (WI-FI®), near field, and/or BLUETOOTH® capability. The data loss prevention service 52 may be applied to stationary or mobile devices utilizing any portion of the electromagnetic spectrum and any signaling standard (such as the IEEE 802 family of standards, GSM/CDMA/TDMA or any cellular standard, and/or the ISM band). The data loss prevention service 52, however, may be applied to any processor-controlled device operating in the radio-frequency domain and/or the Internet Protocol (IP) domain. The data loss prevention service 52 may be applied to any processor-controlled device utilizing a distributed computing network, such as the Internet (sometimes alternatively known as the "World Wide Web"), an intranet, a local-area network (LAN), and/or a wide-area network (WAN). The data loss prevention service 52 may be applied to any processor-controlled device utilizing power line technologies, in which signals are communicated via electrical wiring. Indeed, the many examples may be applied regardless of physical componentry, physical configuration, or communications standard(s).

The computer system 20 may utilize any processing component, configuration, or system. For example, the data loss prevention service 52 may be easily adapted to any desktop, mobile, or server central processing unit or chipset offered by INTEL©, ADVANCED MICRO DEVICES®, ARM®, APPLE®, TAIWAN SEMICONDUCTOR MANU-FACTURING®, QUALCOMM®, or any other manufacturer. The computer system 20 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The data loss prevention service 52 may use packetized communications. When the computer system 20 communicates with the cloud-computing environment 86, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The computer system 20 may utilize any signaling standard. The computer system 20 may communicate with the cloud computing environment 86 using wired networks. The computer system 20 and/or the cloud computing environment 86, however, may utilize wireless communications, such as the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The data loss prevention service 52 may also utilize other standards, such as the I.E.E.E. 802 family of standards, the Industrial, Scientific, and Medical band of the electromagnetic spectrum, BLUETOOTH®, low-power or near-field, and any other standard or value.

The data loss prevention service 52 may be physically embodied on or in a computer-readable storage medium. This computer-readable medium, for example, may include CD-ROM, DVD, tape, cassette, floppy disk, optical disk, USB flash memory drive, memory card, memory drive, and large-capacity disks. This computer-readable medium, or media, could be distributed to end-subscribers, licensees, and assignees. A computer program product comprises processor-executable instructions for providing the data loss prevention service 52, as the above paragraphs explain.

The diagrams, schematics, illustrations, and the like represent conceptual views or processes illustrating examples of the data loss prevention service 52. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that assesses an exfiltration event, comprising:
receiving, by a browser extension installed on the computer system, an event notification from a host operating system alerting of the exfiltration event associated with a browser application;
stopping execution of the exfiltration event associated with the browser application by synchronously blocking, by the browser extension installed on the computer system, the exfiltration event intercepted by the browser extension prior to a receipt by the browser application;
sending, by the browser extension, a duplicate copy of the exfiltration event to an endpoint cybersecurity agent installed on the computer system;

receiving, by the browser extension, an exfiltration decision generated by the endpoint cybersecurity agent indicating the duplicate copy of the exfiltration event represents a normal operation; and
in response to the exfiltration decision indicating the normal operation, asynchronously implementing the duplicate copy of the exfiltration event by sending the duplicate copy of the exfiltration event to the browser application.

2. The method of claim 1, further comprising:
comparing, by the endpoint cybersecurity agent, the duplicate copy of the exfiltration event to a data loss prevention policy associated with a data exfiltration; and
determining, by the endpoint cybersecurity agent, that the duplicate copy of the exfiltration event fails the data loss prevention policy.

3. The method of claim 1, further comprising installing, by the endpoint cybersecurity agent, the browser extension to the computer system.

4. The method of claim 1, further comprising instructing, by the endpoint cybersecurity agent, the browser extension to asynchronously implement the browser input to the browser application by re-triggering the exfiltration event.

5. The method of claim 1, further comprising instructing, by the endpoint cybersecurity agent, the browser extension to re-trigger the duplicate copy of the exfiltration event.

6. The method of claim 1, further comprising performing, by the endpoint cybersecurity agent, a cybersecurity evaluation based on the duplicate copy of the exfiltration event.

7. The method of claim 1, further comprising determining, by the endpoint cybersecurity agent, that the duplicate copy of the exfiltration event conforms with a data loss prevention policy.

8. A computer system that assesses an exfiltration event, comprising:
at least one central processing unit;
a host operating system; and
at least one memory device storing instructions that, when executed by the at least one central processing unit, perform operations, the operations comprising:
installing, by an endpoint cybersecurity agent installed to the computer system, a browser extension to the computer system;
receiving, by the browser extension, an event notification from the host operating system alerting of the exfiltration event associated with a browser application;
synchronously blocking the exfiltration event from a receipt by the browser application by instructing the host operating system;
after the exfiltration event is synchronously blocked, generating, by the browser extension installed by the endpoint cybersecurity agent, a duplicate copy of the exfiltration event;
sending, by the browser extension, the duplicate copy of the exfiltration event to the endpoint cybersecurity agent;
receiving, by the browser extension, an exfiltration decision generated by the endpoint cybersecurity agent indicating the duplicate copy of the exfiltration event represents a normal operation; and
in response to the exfiltration decision indicating the normal operation, asynchronously implementing the duplicate copy of the exfiltration event by sending the duplicate copy of the exfiltration event to the browser application for execution.

9. The at least one computer system of claim 8, wherein the operations further comprise comparing, by the endpoint cybersecurity agent after the exfiltration event is synchronously blocked, the duplicate copy of the exfiltration event to a data loss prevention policy associated with a data exfiltration.

10. The at least one computer system of claim 9, wherein the operations further comprise determining, by the endpoint cybersecurity agent, that the duplicate copy of the exfiltration event fails the data loss prevention policy.

11. The at least one computer system of claim 8, wherein the operations further comprise instructing, by the endpoint cybersecurity agent after the exfiltration event is synchronously blocked, the browser extension to asynchronously implement the exfiltration event to the browser application.

12. The at least one computer system of claim 8, wherein the operations further comprise instructing, by the endpoint cybersecurity agent after the exfiltration event is synchronously blocked, the browser extension to re-trigger the duplicate copy of the exfiltration event.

13. The at least one computer system of claim 8, wherein the operations further comprise performing, by the endpoint cybersecurity agent after the exfiltration event is synchronously blocked, a cybersecurity evaluation based on the duplicate copy of the exfiltration event.

14. The at least one computer system of claim 8, wherein the operations further comprise determining, by the endpoint cybersecurity agent after the exfiltration event is synchronously blocked, that the duplicate copy of the exfiltration event conforms with a data loss prevention policy.

15. A non-transitory memory device storing instructions that, when executed by a central processing unit, perform operations, comprising:

installing a browser extension associated with an endpoint cybersecurity agent;

receiving, by the browser extension, an event notification from a host operating system alerting of an exfiltration event associated with a browser application;

synchronously blocking the exfiltration event by instructing the host operating system to block the exfiltration event prior to a receipt by the browser application;

generating, by the browser extension, a duplicate copy of the exfiltration event;

sending, by the browser extension, the duplicate copy of the exfiltration event to the endpoint cybersecurity agent;

receiving, by the browser extension, an exfiltration decision generated by the endpoint cybersecurity agent based on the duplicate copy of the exfiltration event;

in response to the exfiltration decision confirming the exfiltration event, then maintaining the synchronously blocking of the exfiltration event; and in response to the exfiltration decision indicating the exfiltration event is normal operation, then asynchronously re-triggering the duplicate copy of the exfiltration event for the receipt by the browser application.

16. The non-transitory memory device of claim 15, wherein the operations further comprise comparing the duplicate copy to a data loss prevention policy associated with a data exfiltration.

17. The non-transitory memory device of claim 15, wherein the operations further comprise determining, by the endpoint cybersecurity agent, that the duplicate copy fails a data loss prevention policy.

18. The non-transitory memory device of claim 15, wherein the operations further comprise instructing, by the endpoint cybersecurity agent, the browser extension to store the duplicate copy.

19. The non-transitory memory device of claim 15, wherein the operations further comprise instructing, by the endpoint cybersecurity agent, the browser extension to insert the duplicate copy into the browser application.

20. The non-transitory memory device of claim 15, wherein the operations further comprise performing, by the endpoint cybersecurity agent, a cybersecurity evaluation based on the duplicate copy.

* * * * *